US005668671A

United States Patent [19]
Erdmann

[11] Patent Number: 5,668,671
[45] Date of Patent: Sep. 16, 1997

[54] DIOPTRIC LENS SYSTEM

[75] Inventor: Matthias Erdmann, München, Germany

[73] Assignee: British Aerospace Public Limited Co., Farnborough, United Kingdom

[21] Appl. No.: 302,818

[22] Filed: Sep. 9, 1994

[30] Foreign Application Priority Data

Sep. 17, 1993 [DE] Germany ............................ 43 31 735.9

[51] Int. Cl.[6] .......................... G02B 13/18; G02B 13/14
[52] U.S. Cl. ........................ 359/716; 359/356; 359/357; 359/714
[58] Field of Search ........................... 359/708, 709, 359/710, 711, 712, 713, 714, 715, 716, 355, 356, 357

[56] References Cited

U.S. PATENT DOCUMENTS

| | | | |
|---|---|---|---|
| 2,234,707 | 3/1941 | Ott | 359/791 |
| 3,778,133 | 12/1973 | Tatian | 359/708 |
| 4,537,464 | 8/1985 | Boutellier | 359/785 |
| 4,695,119 | 9/1987 | Neil | 359/708 |
| 4,892,398 | 1/1990 | Kudo et al. | 359/708 |
| 5,251,063 | 10/1993 | Baumann | 359/716 |
| 5,446,581 | 8/1995 | Jamieson | 359/716 |

FOREIGN PATENT DOCUMENTS

| | | |
|---|---|---|
| 2 270 607 | 12/1975 | France . |
| 33 22 311 A1 | 12/1983 | Germany . |
| 42 34 721 A1 | 4/1993 | Germany . |
| 1 451 276 | 9/1976 | United Kingdom . |
| 2 071 353 | 9/1981 | United Kingdom . |

*Primary Examiner*—Scott J. Sugarman
*Attorney, Agent, or Firm*—George W. Neuner

[57] ABSTRACT

A dioptric lens system comprises a plurality of lenses and a rear diaphragm functioning as an aperture diaphragm. An overall length in the order of the focal distance is obtained by the features that the object side surface of the object side lens comprises an aspherical component and that the intermediate and image side lenses are closely adjacent.

21 Claims, 29 Drawing Sheets

12.50 MM

|—| 0.008906mm

Example 1, 86mm/1.8
contacting lenses

DIFFRACTION INTENSITY
SPREAD FUNCTION

| WAVELENGTH | WEIGHT |
|---|---|
| 4900.0 nm | 25 |
| 4700.0 nm | 100 |
| 4200.0 nm | 100 |
| 3900.0 nm | 100 |
| 3700.0 nm | 60 |
| 3500.0 nm | 30 |

FLD (0.00, 0.00)MAX, (0.0, 0.0)DEG
DEFOCUSING: 0.000000 mm
CONTOUR INTERVAL: 9 PERCENT

Example 1, 86 mm/1.8
contacting lenses

DIFFRACTION INTENSITY
SPREAD FUNCTION 0.008906mm

| WAVELENGTH | WEIGHT |
|---|---|
| 4900.0 nm | 25 |
| 4700.0 nm | 100 |
| 4200.0 nm | 100 |
| 3900.0 nm | 100 |
| 3700.0 nm | 60 |
| 3500.0 nm | 30 |

FLD(0.00, 0.60) MAX, (0.0, 3.8) DEG
DEFOCUSING: 0.000000 mm
CONTOUR INTERVAL: 9 PERCENT

Example 1, 86mm/1.8
contacting lenses

DIFFRACTION INTENSITY
SPREAD FUNCTION 0.008906mm

| WAVELENGTH | WEIGHT |
|---|---|
| 4900.0 nm | 25 |
| 4700.0 nm | 100 |
| 4200.0 nm | 100 |
| 3900.0 nm | 100 |
| 3700.0 nm | 60 |
| 3500.0 nm | 30 |

FLD(0.00,0.80)MAX,(0.0,5.1)DEG
DEFOCUSING: 0.000000 mm
CONTOUR INTERVAL: 9 PERCENT

Example 1, 86mm/1.8
contacting lenses

DIFFRACTION INTENSITY
SPREAD FUNCTION

|— 0.008906mm —|

| WAVELENGTH | WEIGHT |
|---|---|
| 4900.0 nm | 25 |
| 4700.0 nm | 100 |
| 4200.0 nm | 100 |
| 3900.0 nm | 100 |
| 3700.0 nm | 60 |
| 3500.0 nm | 30 |

FLD (0.00, 1.00) MAX, (0.0, 6.4) DEG
DEFOCUSING : 0.000000 mm
CONTOUR INTERVAL : 9 PERCENT

Example 2, 86mm/1.8
conical surface 1

DIFFRACTION INTENSITY
SPREAD FUNCTION 0.008906mm

| WAVELENGTH | WEIGHT |
|---|---|
| 4900.0 nm | 25 |
| 4700.0 nm | 100 |
| 4200.0 nm | 100 |
| 3900.0 nm | 100 |
| 3700.0 nm | 60 |
| 3500.0 nm | 30 |

FLD (0.00,0.00)MAX(0.0,0.0)DEG
DEFOCUSING : 0.000000mm
CONTOUR INTERVAL : 9 PERCENT

Example 2, 86mm/1.8
conical surface 1

DIFFRACTION INTENSITY
SPREAD FUNCTION

| WAVELENGTH | WEIGHT |
|---|---|
| 4900.0 nm | 25 |
| 4700.0 nm | 100 |
| 4200.0 nm | 100 |
| 3900.0 nm | 100 |
| 3700.0 nm | 60 |
| 3500.0 nm | 30 |

0.008906mm

FDL(0.00,0.60)MAX,(0.0,3.8)DEG
DEFOCUSING : 0.000000 mm
CONTOUR INTERVAL: PERCENT

Example 2, 86mm/1.8
conical surface 1

DIFFRACTION INTENSITY
SPREAD FUNCTION

|  | 0.008906mm |
|---|---|
| WAVELENGTH | WEIGHT |
| 4900.0 nm | 25 |
| 4700.0 nm | 100 |
| 4200.0 nm | 100 |
| 3900.0 nm | 100 |
| 3700.0 nm | 60 |
| 3500.0 nm | 30 |

FLD (0.00, 0.80) MAX, (0.0, 5.1) DEG
DEFOCUSING: 0.000000 mm
CONTOUR INTERVAL: 9 PERCENT

Example 2, 86mm/1.8
conical surface 1

DIFFRACTION INTENSITY
SPREAD FUNCTION 0.008906mm

| WAVELENGTH | WEIGHT |
|---|---|
| 4900.0 nm | 25 |
| 4700.0 nm | 100 |
| 4200.0 nm | 100 |
| 3900.0 nm | 100 |
| 3700.0 nm | 60 |
| 3500.0 nm | 30 |

FLD (0.00, 1.00) MAX, (0.0, 6.4) DEG
DEFOCUSING: 0.000000 mm
CONTOUR INTERVAL: 9 PERCENT

Example 3, Si-Ge-Zn
Se lenses
DIFFRACTION INTENSITY
SPREAD FUNCTION 0.008906mm

| WAVELENGTH | WEIGHT |
|---|---|
| 4900.0 nm | 25 |
| 4700.0 nm | 100 |
| 4200.0 nm | 100 |
| 3900.0 nm | 100 |
| 3700.0 nm | 60 |
| 3500.0 nm | 30 |

FLD (0.00, 0.00) MAX, (0.0, 0.0) DEG
DEFOCUSING: 0.000000 mm
CONTOUR INTERVAL: 9 PERCENT

Example 3, Si-Ge-Zn Se lenses

DIFFRACTION INTENSITY SPREAD FUNCTION 0.008906mm

| WAVELENGTH | WEIGHT |
|---|---|
| 4900.0 nm | 25 |
| 4700.0 nm | 100 |
| 4200.0 nm | 100 |
| 3900.0 nm | 100 |
| 3700.0 nm | 60 |
| 3500.0 nm | 30 |

FLD(0.00,0.60)MAX,(0.0,3.8)DEG
DEFOCUSING: 0.000000 mm
CONTOUR INTERVAL: 9 PERCENT

Example 3, Si-Ge-Zn Se lenses

DIFFRACTION INTENSITY SPREAD FUNCTION

| WAVELENGTH | WEIGHT |
|---|---|
| 4900.0 nm | 25 |
| 4700.0 nm | 100 |
| 4200.0 nm | 100 |
| 3900.0 nm | 100 |
| 3700.0 nm | 60 |
| 3500.0 nm | 30 |

0.008906 mm

FLD (0.00, 0.80) MAX, (0.0, 5.1) DEG
DEFOCUSING: 0.000000 mm
CONTOUR INTERVAL: 9 PERCENT

Example 3, Si – Ge – Zn Se lenses

DIFFRACTION INTENSITY SPREAD FUNCTION 0.008906mm

| WAVELENGTH | WEIGHT |
|---|---|
| 4900.0 nm | 25 |
| 4700.0 nm | 100 |
| 4200.0 nm | 100 |
| 3900.0 nm | 100 |
| 3700.0 nm | 60 |
| 3500.0 nm | 30 |

FLD(0.00,1.00)MAX,(0.0,6.4)DEG
DEFOCUSING : 0.000000mm
CONTOUR INTERVAL: 9 PERCENT

Example 4, 86mm/1.4,
conical surface 1,
4 lenses
DIFFRACTION INTENSITY
SPREAD FUNCTION

|  | 0.008906mm |
|---|---|
| WAVELENGTH | WEIGHT |
| 4900.0 nm | 25 |
| 4700.0 nm | 100 |
| 4300.0 nm | 100 |
| 3900.0 nm | 100 |
| 3700.0 nm | 60 |
| 3500.0 nm | 30 |

FLD(0.00,0.00)MAX,(0.0,0.0)DEG
DEFOCUSING: 0.000000mm
CONTOUR INTERVAL : PERCENT

Example 4, 86mm/1.4,
conical surface 1,
4 lenses
DIFFRACTION INTENSITY
SPREAD FUNCTION

|  | 0.008906mm |
|---|---|
| WAVELENGTH | WEIGHT |
| 4900.0 nm | 25 |
| 4700.0 nm | 100 |
| 4300.0 nm | 100 |
| 3900.0 nm | 100 |
| 3700.0 nm | 60 |
| 3500.0 nm | 30 |

FLD (0.00, 0.60) MAX, (0.0, 3.8) DEG
DEFOCUSING: 0.000000 mm
CONTOUR INTERVAL: 9 PERCENT

Example 4, 86 mm/1.4,
conical surface 1,
4 lenses
DIFFRACTION INTENSITY
SPREAD FUNCTION 0.008906mm

| WAVELENGTH | WEIGHT |
|---|---|
| 4900.0 nm | 25 |
| 4700.0 nm | 100 |
| 4300.0 nm | 100 |
| 3900.0 nm | 100 |
| 3700.0 nm | 60 |
| 3500.0 nm | 30 |

FLD(0.00,0.80)MAX,(0.0,5.1)DEG
DEFOCUSING: 0.000000 mm
CONTOUR INTERVAL: 9 PERCENT

Example 4, 86mm/1.4
conical surface 1,
4 lenses
DIFFRACTION INTENSITY
SPREAD FUNCTION

| WAVELENGTH | WEIGHT |
|---|---|
| 4900.0 nm | 25 |
| 4700.0 nm | 100 |
| 4300.0 nm | 100 |
| 3900.0 nm | 100 |
| 3700.0 nm | 60 |
| 3500.0 nm | 30 |

FLD(0.00,1.00)MAX,(0.0,6.4)DEG
DEFOCUSING: 0.000000 mm
CONTOUR INTERVAL: 9 PERCENT 0.008906mm

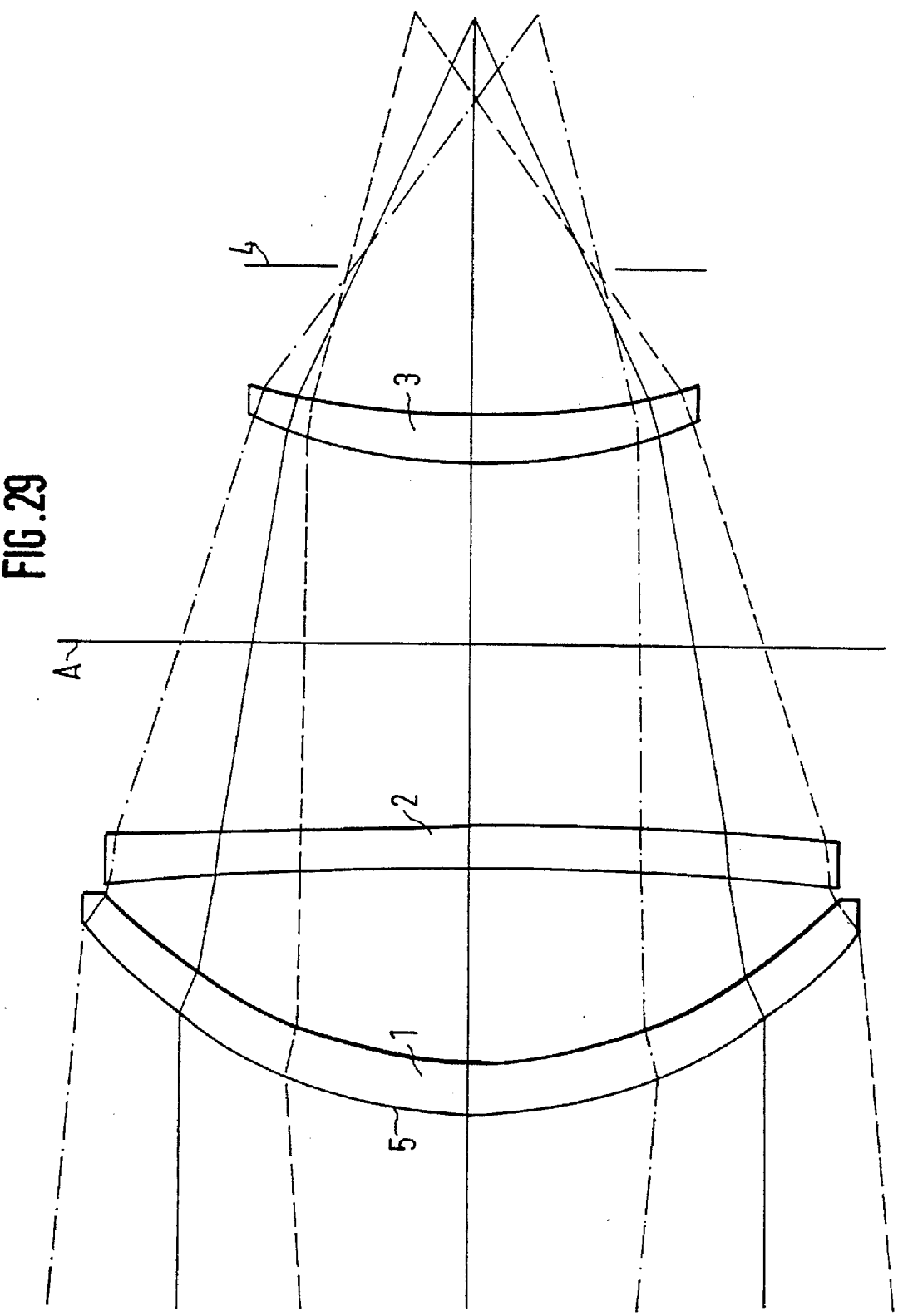

DIOPTRIC LENS SYSTEM

BACKGROUND OF THE INVENTION

The invention relates to a dioptric lens system having an object side lens, an intermediate lens and an image side lens.

Such a dioptric lens system is known from document DE 42 34 721 A1. This known lens system as shown in FIG. 29 comprises an object side (front) lens 1, an intermediate lens 2 and an image side lens 3. A rear diaphragm 4 is provided behind the image side lens 3. The object side surface 5 of lens 1 is aspherical. As clearly shown in FIG. 29 the object side lens 1 is close to the intermediate lens 2 and a larger spacing is provided between the image side lens 3 and both front lenses.

Owing to the rear diaphragm 4 which functions as aperture diaphragm the known lens system can advantageously be used in the infrared region for cooled plane detectors in a Dewar having an inner cold shield. Further, the known lens system has a relatively short overall length. In FIG. 29 the rear principal plane defining the focal length of the lens system is indicated by the straight line A. As can be easily seen from FIG. 29 the overall length extends from the image plane by a factor of nearly 2 of the focal length.

Thus, the lens assembly is still relatively long. Moreover, all three object side surfaces of the three lenses of the lens system are aspherical. This results in increased costs in producing the lens system.

Owing to the fact that the exit pupil is formed by a rear diaphragm the entrance pupil is located as a virtual image of the exit pupil behind the lens system in light direction. This results in oversized diameters of the lenses and in particular of the front lenses which are positioned far in front of the entrance pupil.

The U.S. Pat. No. 2 234 707 discloses a photographic lens system having an object side lens with a positive refractive power and an intermediate lens with a positive refractive power, whereby the object side lens and the intermediate lens are combined in a screw mounting. An image side lens is formed as a dispersing lens. A rear diaphragm forming the exit pupil of the lens system is an entrance opening into the photographic apparatus.

OBJECTS OF THE INVENTION

It is an object of the invention to provide an improved dioptric lens system. It is a further object of the invention to provide a dioptric lens system having a reduced diameter and total length, i.e. overall length plus focal intercept, as compared with the lens system disclosed in document DE 42 34 721 A1. It is a still further object of the invention to provide a dioptric lens system which is less costly to produce.

SUMMARY OF THE INVENTION

According to the invention a dioptric lens system comprises an object side lens having a positive refractive power and an aspherical object side surface, an intermediate dispersing lens, a first spacing between said object side lens and said intermediate lens, an image side lens having a positive refractive power, a second spacing between said image side lens and said intermediate lens, said second spacing being substantially smaller than said first spacing, and a rear diaphragm constituting an exit pupil of said lens system.

A particularly advantageous application of such a dioptric lens system is in the field of infrared lenses, because the rear diaphragm forming the aperture diaphragm is sufficiently spaced from the lenses so that the rear diaphragm can for example be mounted within a Dewar vessel as inner cold shield. The length of the lens system is so short that the distance of a focal length from the image plane is typically in front of the lens system. All lens systems in the following examples are defraction limited in the center of the image.

Preferably the lens system may form part of a more complex lens system by being provided within a system of preceding, intermediate or following components such as a protecting dome, windows, beam splitters, prisms, screens and mirrors.

BRIEF DESCRIPTION OF THE DRAWINGS

Further advantages, features and objects of the invention will stand out from the following description of exemplary embodiments with reference to the drawings.

In the drawings

FIG. 29 shows a lens system with three lenses and rear diaphragm according to the prior art.

DESCRIPTION OF PREFERRED EMBODIMENTS

EXAMPLE 1

Figure 1:
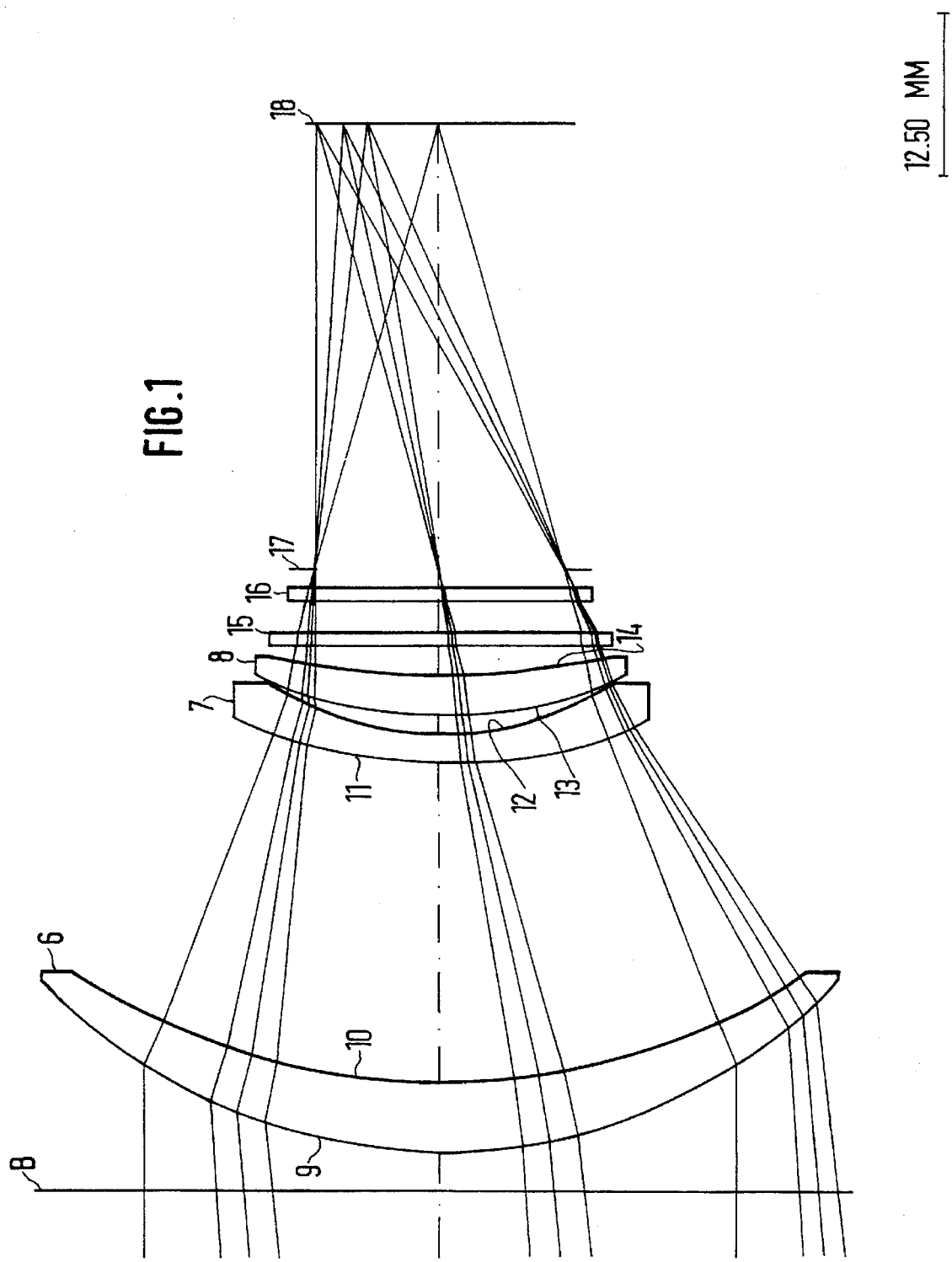
FIG. 1 shows a first embodiment of the lens system having three lenses whereby the two image side lenses are in contact.

FIG. 1 shows a lens system having three lenses, namely an object side lens 6, an intermediate lens 7 and an image side lens 8. The object side lens 6 consists of a material having a relatively low dispersion, namely silicon, and has a positive refractive power. Further, the object side lens 6 has an object side surface 9 and an image side surface 10. The object side surface 9 is convex with a positive radius of curvature, i.e. the object side surface 9 is forwardly curved. It is also aspherical. The image side surface 10 is concave, i.e. it also has a positive radius of curvature. The radius of curvature of the image side surface 10 is greater than the radius of curvature of the object side surface 9.

The intermediate lens 7 consists of a material which has a relatively larger dispersion as compared with the material of the object side lens 6. In the present case the intermediate lens 7 is made of germanium. The intermediate lens 7 has a negative refractive power, a convex object side surface 11 and a concave image side surface 12. The radius of curvature of the image side surface 12 is smaller than that of the object side surface 11.

The image side lens 8 is made of a material with relatively low dispersion, namely silicon, and has a positive refractive power. The image side lens 8 has a convex object side surface 13 and a concave image side surface 14. The radius of curvature of the image side surface 14 is greater that that of the object side surface 13.

The object side surface 9 of the first lens 6 has an additional aspherical component. This component is in particular a conical component of −0.083265. The coefficients of higher order are A=0 442096×10$^{-7}$, B=0 000000×10$^{0}$, C=0.409682×10$^{-13}$ and D=−0.319450×10$^{-17}$.

As shown in FIG. 1, the intermediate lens 7 contacts the image side lens 8 so that no distance washer is required between the intermediate lens 7 and the image side lens 8 in the lens system shown in FIG. 1. An air space is, however, formed between the object side lens 6 and the intermediate lens 7.

As shown in FIG. 1, a filter formed by a germanium disk 15 is provided at the image side of the image side lens. The germanium disk is plane-parallel and therefore both surfaces thereof have an infinite radius.

The lens system of FIG. 1 is in particular intended for use in the infrared region. The image receiver is therefore disposed in a cooled Dewar vessel. The inlet of the Dewar vessel is closed by a sapphire disk 16. The sapphire disk 16 has plane-parallel surfaces with corresponding infinite radii.

The filter and the window are taken into consideration for optical correction.

The rear diaphragm 17 serving as aperture diaphragm of the lens system is disposed within the cooled Dewar vessel and cooled therein. Since the rear diaphragm 17 constitutes the aperture diaphragm the detector at the image plane 18 can "view" only the cooled rear diaphragm acting as an inner cold shield and the optical components. Other uncooled diaphragms and mountings can not be viewed by the detector.

The lens system has a focal length of 86 mm. The aperture ratio is 1:1.8. The overall length is 81 mm. The wavelength transmission range is about 3–5 μm.

FIG. 1 shows a line B indicating the principal plane for determining the focal length of the lens system. As shown in FIG. 1, the principal plane is in front of the lens system. The lens system is therefore a telephoto lens.

The exact lens data are given in the following table 1:

TABLE 1

| | radius | thickness | material |
|---|---|---|---|
| object: | infinite | infinite | |
| 1: | 43.387 | 5.50 | silicon |
| 2: | 53.206 | 25.15 | |
| 3: | 38.154 | 2.40 | germanium |
| 4: | 25.716 | 1.54 | |
| 5: | 38.206 | 3.00 | silicon |
| 6: | 63.747 | 2.41 | |
| 7: | infinite | 1.00 | germanium |
| 8: | infinite | 2.50 | |
| 9: | infinite | 1.00 | sapphire |
| 10: | infinite | 1.50 | |
| 11: | infinite | 34.90 | |
| 12: | infinite | 0.10 | silicon |
| 13: | infinite | 0.00 | |
| image | infinite | 0.00 | |

Aspherical component:

K: −0.083265
A: 0.442096E − 07   B: 0.000000E + 00   C: 0.409682E − 13
D: −.319450E − 17

The aspherical constants are defined by the following equation for the surface of the lens:

$$Z = \frac{ch^2}{1 + SQRT\{1 - (1+k)c^2 h^2\}} + Ah^4 + Bh^6 + Ch^8 + Dh^{10}$$

wherein Z is the coordinate along the optical axis, h is the coordinate perpendicular to the optical axis and K is the conical coefficient.

K=0: sphere
0>K>−1: ellipsoid having a longitudinal axis coinciding with the optical axis
K=−1: paraboloid
K<−1: hyperboloid The lens data are explained as follows. The left-hand column specifies the successive numbering of the surfaces whereby the object is indicated in the first line. The numbers 1 and 2 given in table 1 indicate the first lens, the numbers 3 and 4 the second lens and the numbers 5 and 6 the third lens. The numbers 7 and 8 indicate the filter 15, the numbers 9 and 10 the sapphire window 16, the number 11 the rear diaphragm 17 and the numbers 12 and 13 the silicon detector carrier (not shown in the figure).

The second column in table 1 specifies the radius of curvature of the corresponding surface. If the radius is positive, the surface has a double-sided position of the center of curvature.

The third column in table 1 specifies the "thickness" which means the respective distance of the corresponding surface from the next following surface.

Finally, the fourth column specifies the material which exists at the image side of the surface. No specification means air.

Finally, "image" means the image plane which in this example has no curvature, i.e. an infinite radius.

Tables 2 to 4 are set up in the same manner as table 1.

Figure 2:
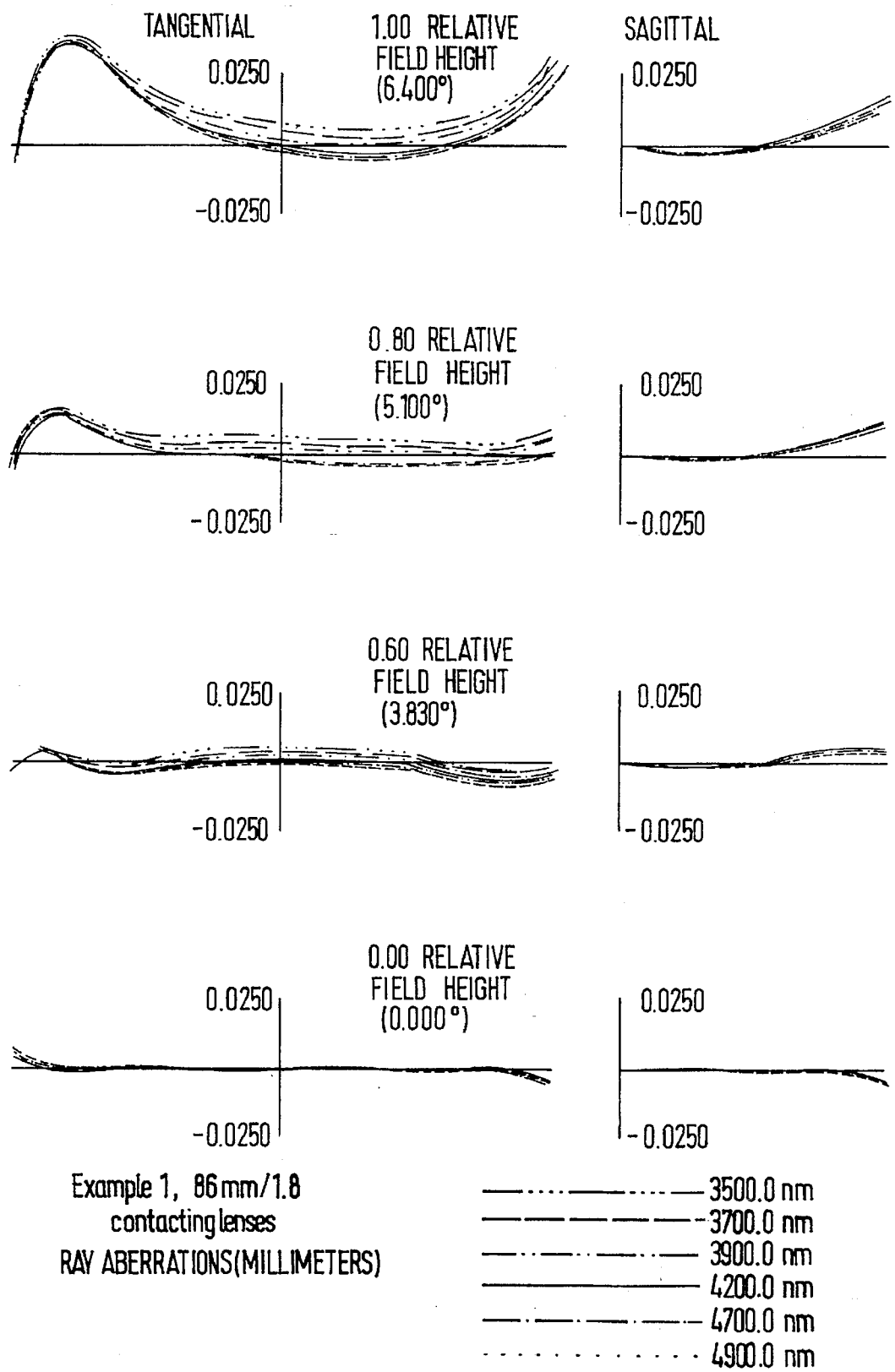
FIG. 2 shows the aberration for the lens system shown in FIG. 1.

FIG. 2 shows the usual aberration curves of the lens system of FIG. 1 for the transverse beam aberration within the image plane as a function of the height of incidence on the object side. On the left side the aberration is shown for the tangential section and on the right side for the sagittal section. The upper part indicates the aberration for 6.4 degrees field height (relative field height 1.00), the second part in FIG. 2 indicates the values for the field height of 5.1 degrees (0.80 relative field height), the third part in FIG. 1 indicates the values for a field height of 3.83 degrees (0.60 relative field height) and the lowermost part indicates the values for the field height of 0 degrees (on the axis). The various curves in each figure indicate the values for different wavelengths. Wavelengths of 3.5 µm, 3.7 µm, 3.9 µm, 4.2 µm, 4.7 µm and 4.9 µm are shown.

Figure 9:
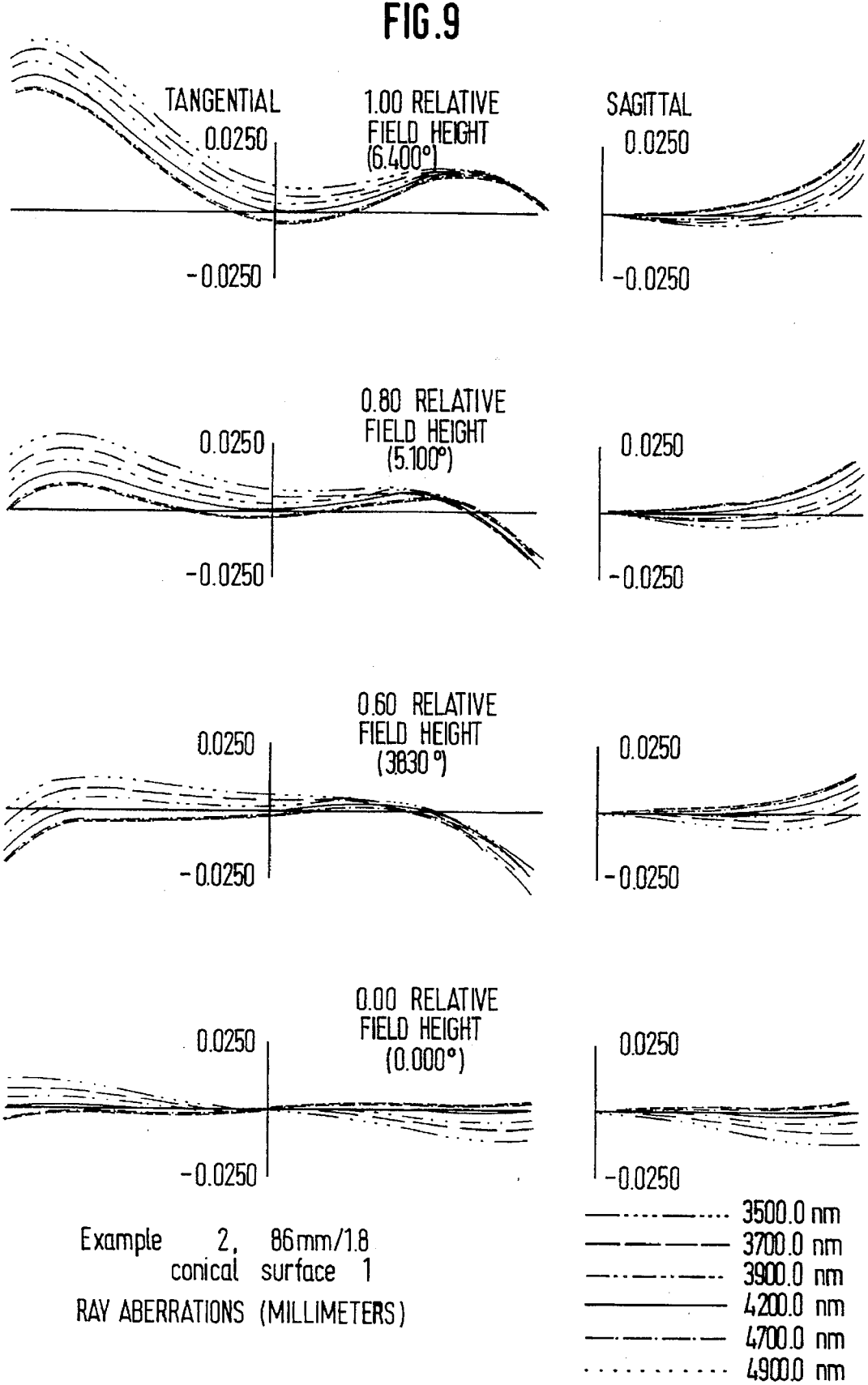
FIG. 9 shows the aberration of the lens system shown in FIG. 8.
Figure 16:
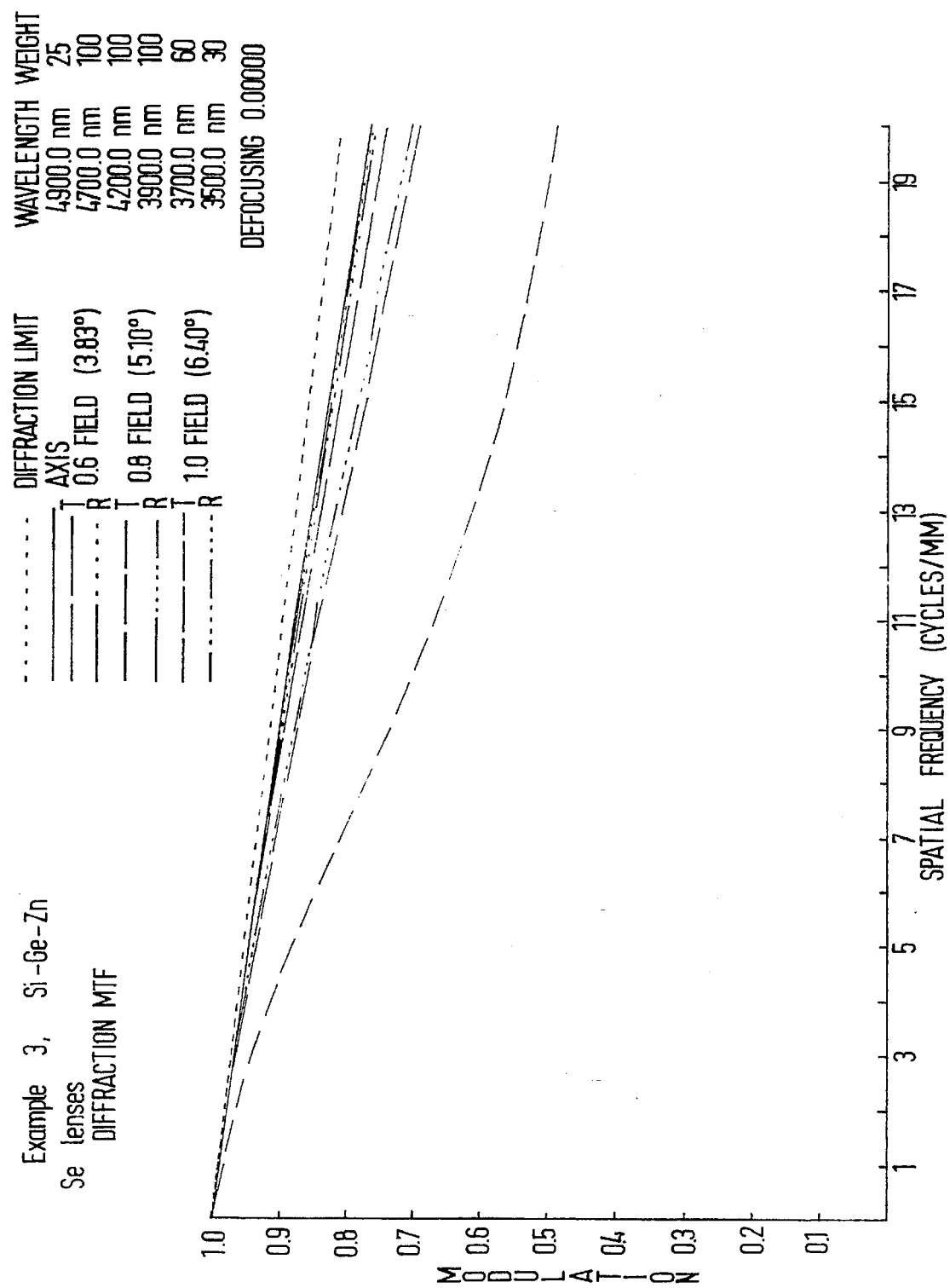
FIG. 16 shows the modulation transfer function of the lens system shown in FIG. 15.
Figure 23:
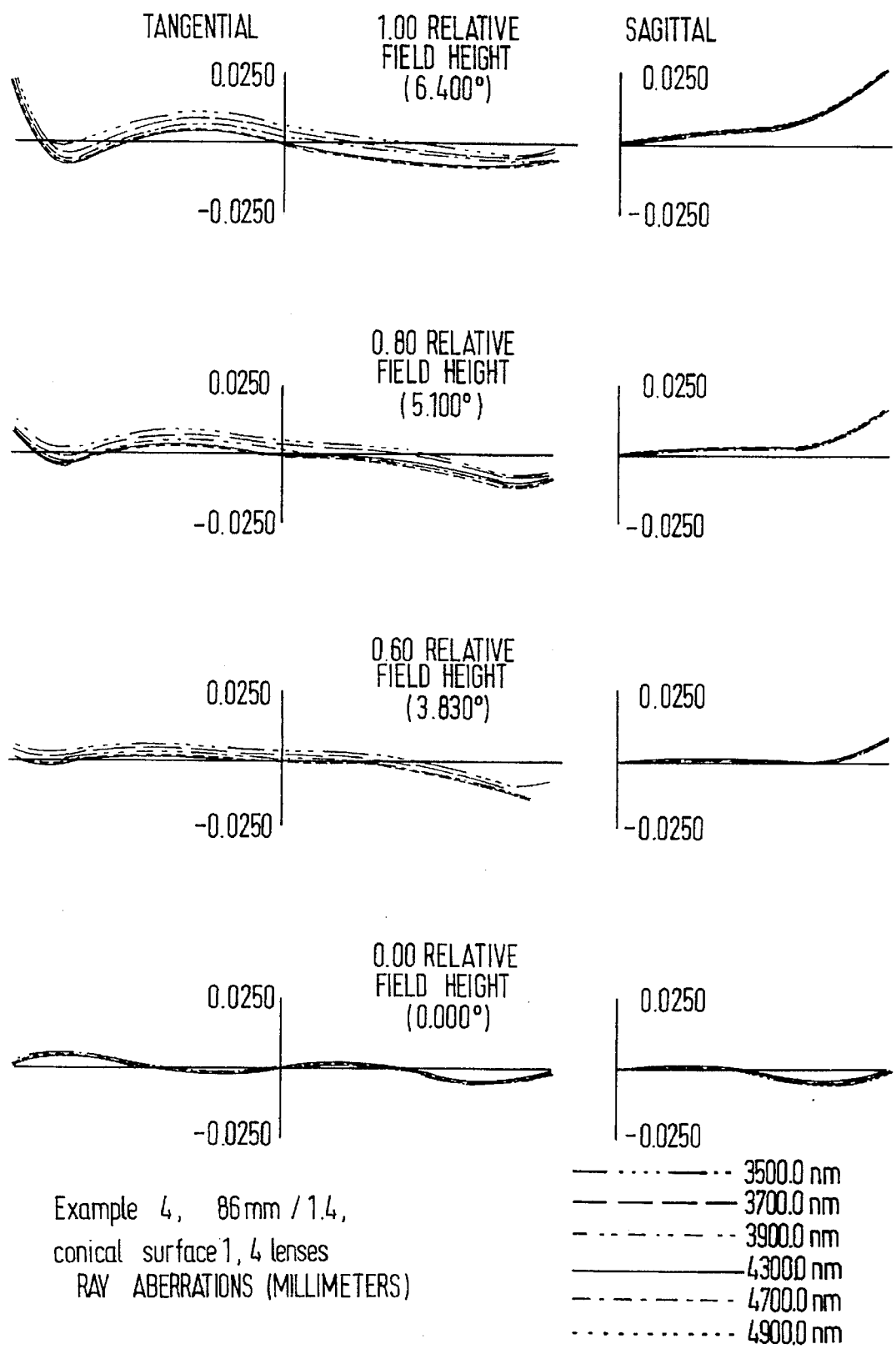
FIG. 23 shows the aberration of the lens system of FIG. 22.

FIGS. 9, 16 and 23 are set up correspondingly.

Figure 3:
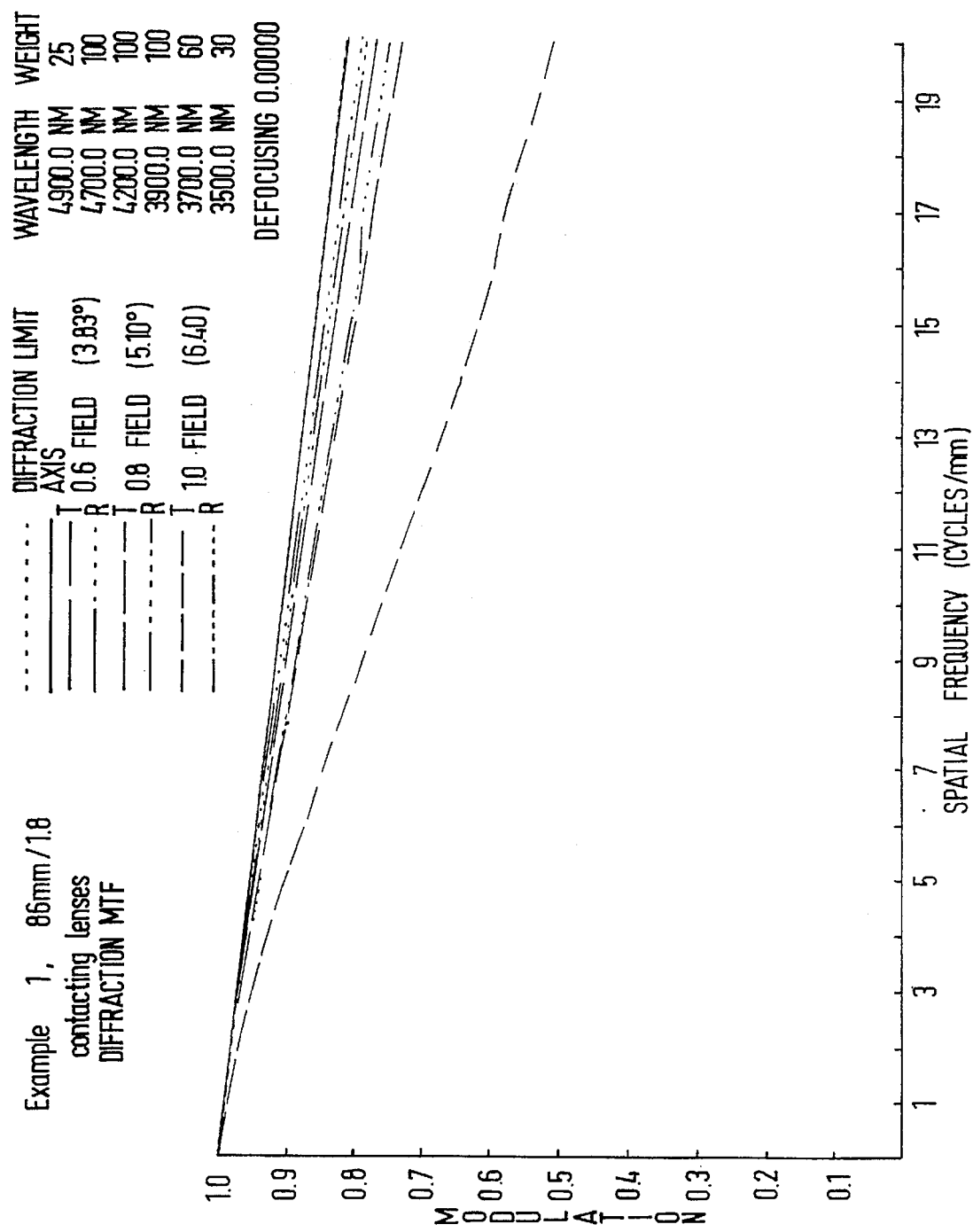
FIG. 3 shows the modulation transfer function of the lens system shown in FIG. 1.

FIG. 3 shows the modulation transfer function of the lens system of FIG. 1 as a function of the spatial frequency in the image plane. Values on the axis, for 3.83 degrees (0.6 relative field height), for 5.1 degrees (0.8 relative field height) and for 6.4 degrees (1.0 relative field height) are given. Two values are given in each case, namely the tangential (T) and the radial (sagittal) (R) section. The wavelength region 4.9 µm has been given a weight of 25, the one of 4.7 µm a weight of 100, the one of 4.2 µm a weight of 100, the one of 3.9 µm a weight of 100, the one of 3.7 µm a weight of 60 and the one of 3.5 µm a weight of 30.

Figure 17:
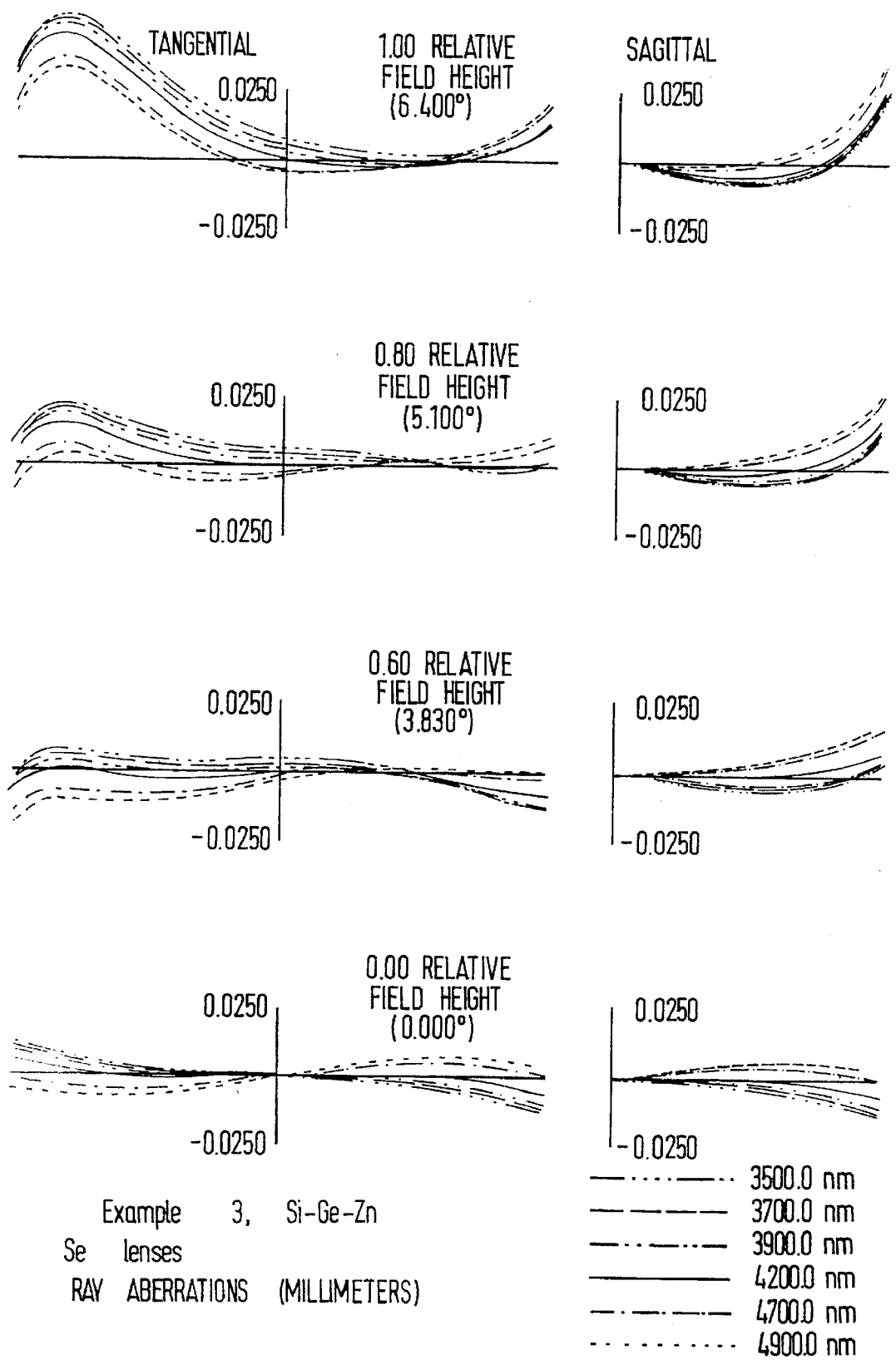
FIG. 17 shows the aberration of the lens system of FIG. 15.
Figure 24:
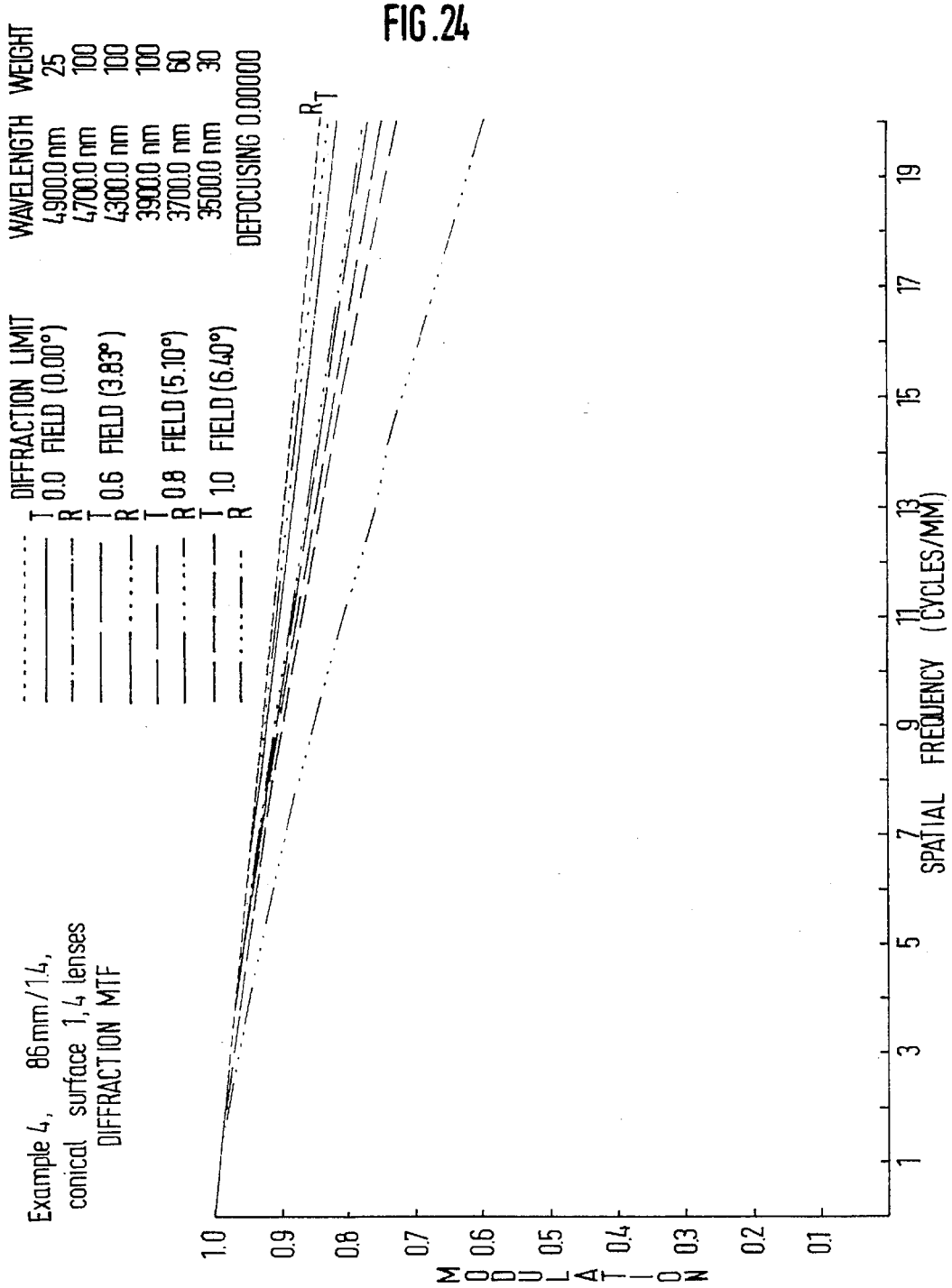
FIG. 24 shows the modulation transfer function of the lens system shown in FIG. 22.

FIGS. 9, 17 and 24 are set up in corresponding manner.

FIGS. 4 to 7 show the point-spread function as a representation of the "pulse response" of an optical system. The very informative isophotal representation has been selected and defraction effects have been taken into consideration.

Figure 4:
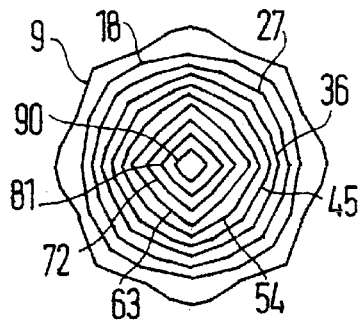
FIG. 4 shows the point-spread function of the lens system shown in FIG. 1 in isophotal representation with a field point of (0.0; 0.0) degrees.
Figure 11:
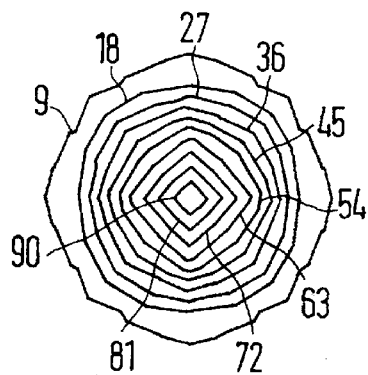
FIG. 11 shows the point-spread function of the lens system shown in FIG. 8 in isophotal representation with a field point of (0.0; 0.0) degrees.
Figure 18:
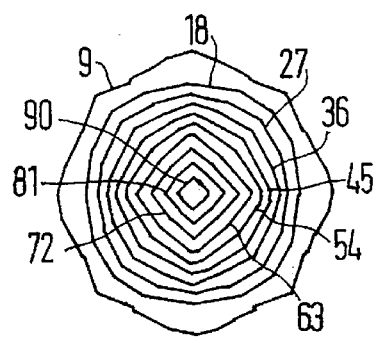
FIG. 18 shows the point spread-function of the lens system of FIG. 15 in isophotal representation with a field point of (0.0; 0.0) degrees.
Figure 25:
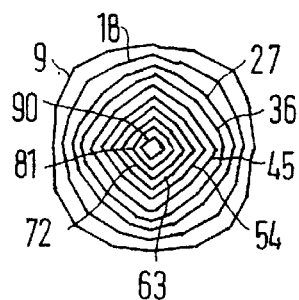
FIG. 25 shows the point-spread function of the lens system of FIG. 22 in isophotal representation with a field point of (0.0; 0.0) degrees.

In FIG. 4 the values for (0.0; 0.0) degrees field position are indicated. The weighting of the wavelength has been made as in FIG. 3. The distance of the contour lines in FIG. 4 is 9%. The center is normalized to 1 (100%). The FIGS. 11, 18 and 25 correspond to FIG. 4.

Figure 5:
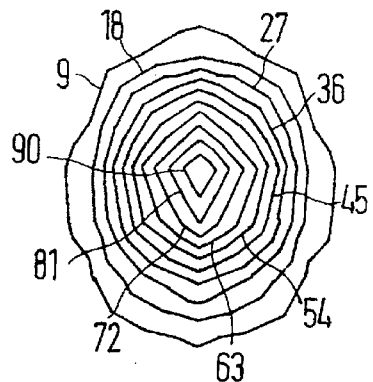
FIG. 5 shows the point-spread function as in FIG. 4 with a field point of (0.0; 3.8) degrees.
Figure 12:
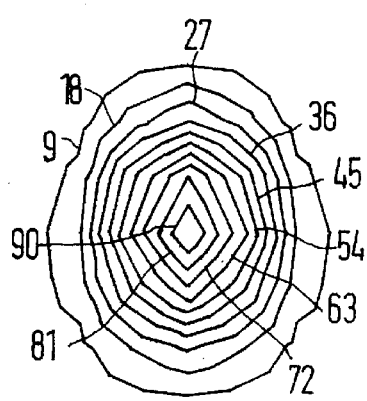
FIG. 12 shows the point-spread function as in FIG. 11 with a field point of (0.0; 3.8) degrees.
Figure 19:
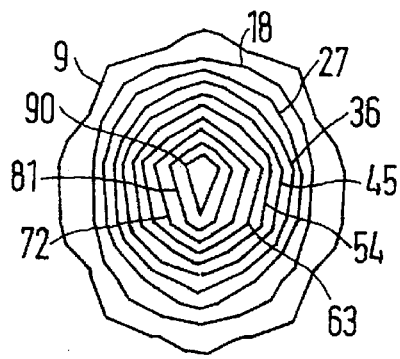
FIG. 19 shows the point-spread function of FIG. 18 with a field point of (0.0; 3.8) degrees.
Figure 26:
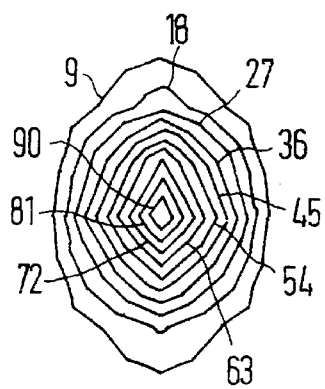
FIG. 26 shows the point-spread function of FIG. 25 with a field point of (0.0; 3.8) degrees.

The set-up of FIG. 5 corresponds exactly to FIG. 4 with the field point being at (0.0; 3.8) degrees (relative height 0.6). The FIGS. 12, 19 and 26 are set up in the same manner as FIG. 5.

Figure 6:
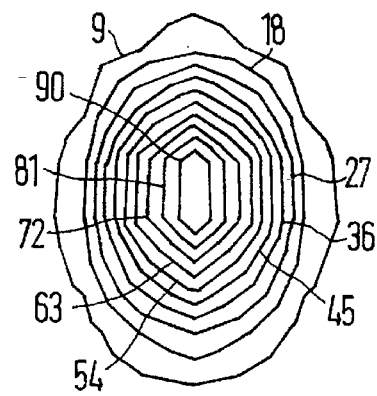
FIG. 6 shows the point-spread function as in FIG. 4 with a field point of (0.0; 5.1) degrees.
Figure 13:
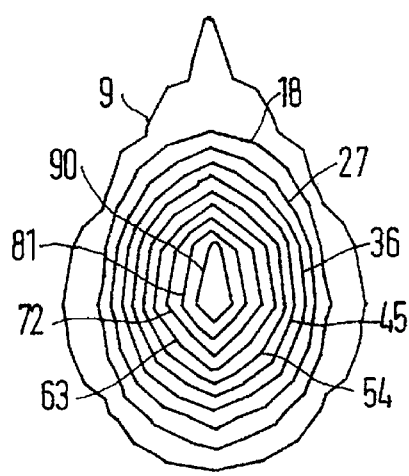
FIG. 13 shows the point-spread function as in FIG. 11 with a field point of (0.0; 5.1) degrees.
Figure 20:
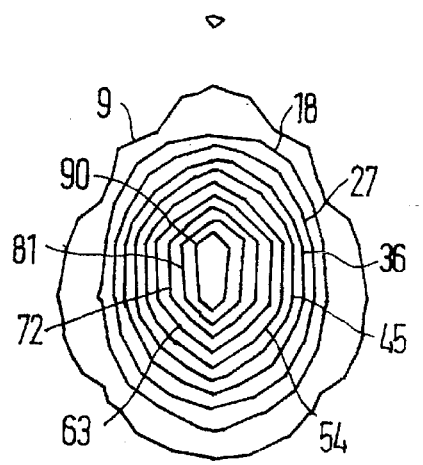
FIG. 20 shows the point-spread function of FIG. 18 with a field point of (0.0; 5.1) degrees.
Figure 27:
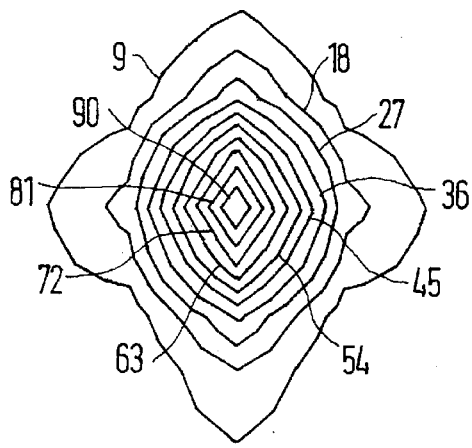
FIG. 27 shows the point-spread function of FIG. 25 with a field point of (0.0; 5.1) degrees.

FIG. 6 is set up in the same manner as FIG. 4. However, the field position is (0.0; 5.1) degrees (0.8 relative field height). The FIGS. 13, 20 and 27 are set up in the same manner as FIG. 6.

Figure 7:
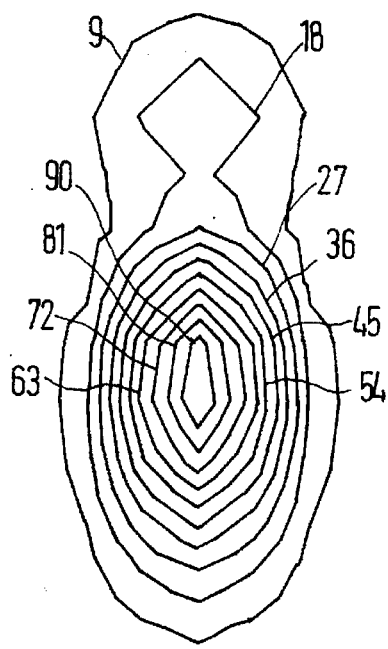
FIG. 7 shows the point-spread function as in FIG. 4 with a field point of (0.0; 6.4) degrees.
Figure 14:
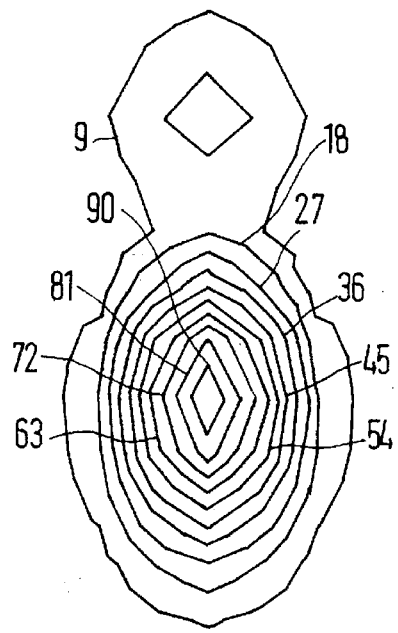
FIG. 14 shows the point-spread function as in FIG. 11 with a field point of (0.0; 6.4) degrees.
Figure 21:
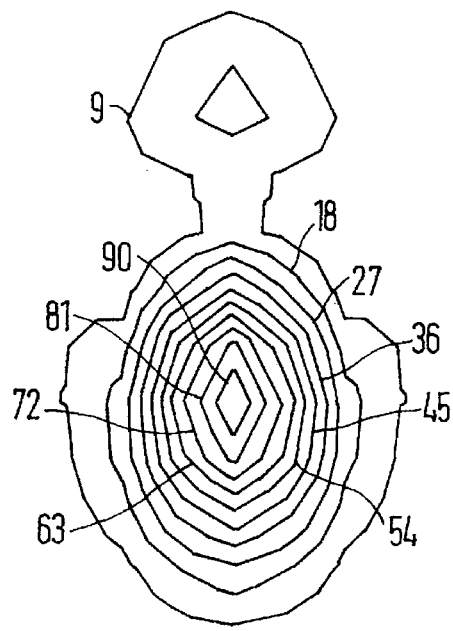
FIG. 21 shows the point-spread function of FIG. 18 with a field point of (0.0; 6.4) degrees.
Figure 28:
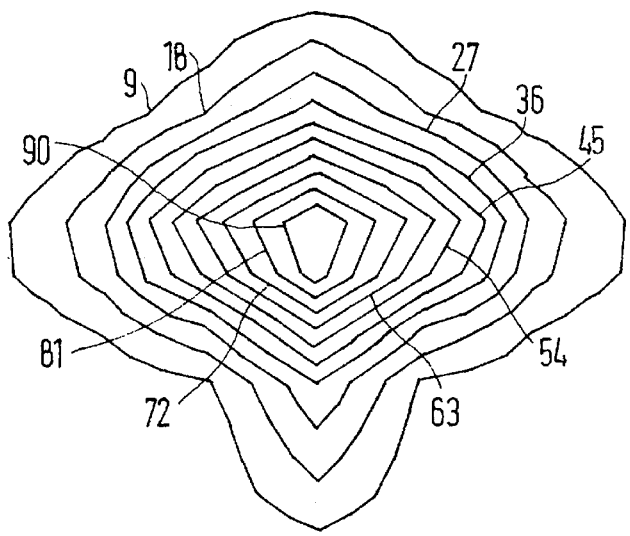
FIG. 28 shows the point-spread function of FIG. 27 with a field point of (0.0; 6.4) degrees.

FIG. 7 is set up as FIG. 4. However, the field position is (0.0; 6.4) degrees (1.0 relative field height). The FIGS. 14, 21 and 28 are set up in the same manner as FIG. 7.

EXAMPLE 2

Figure 8:
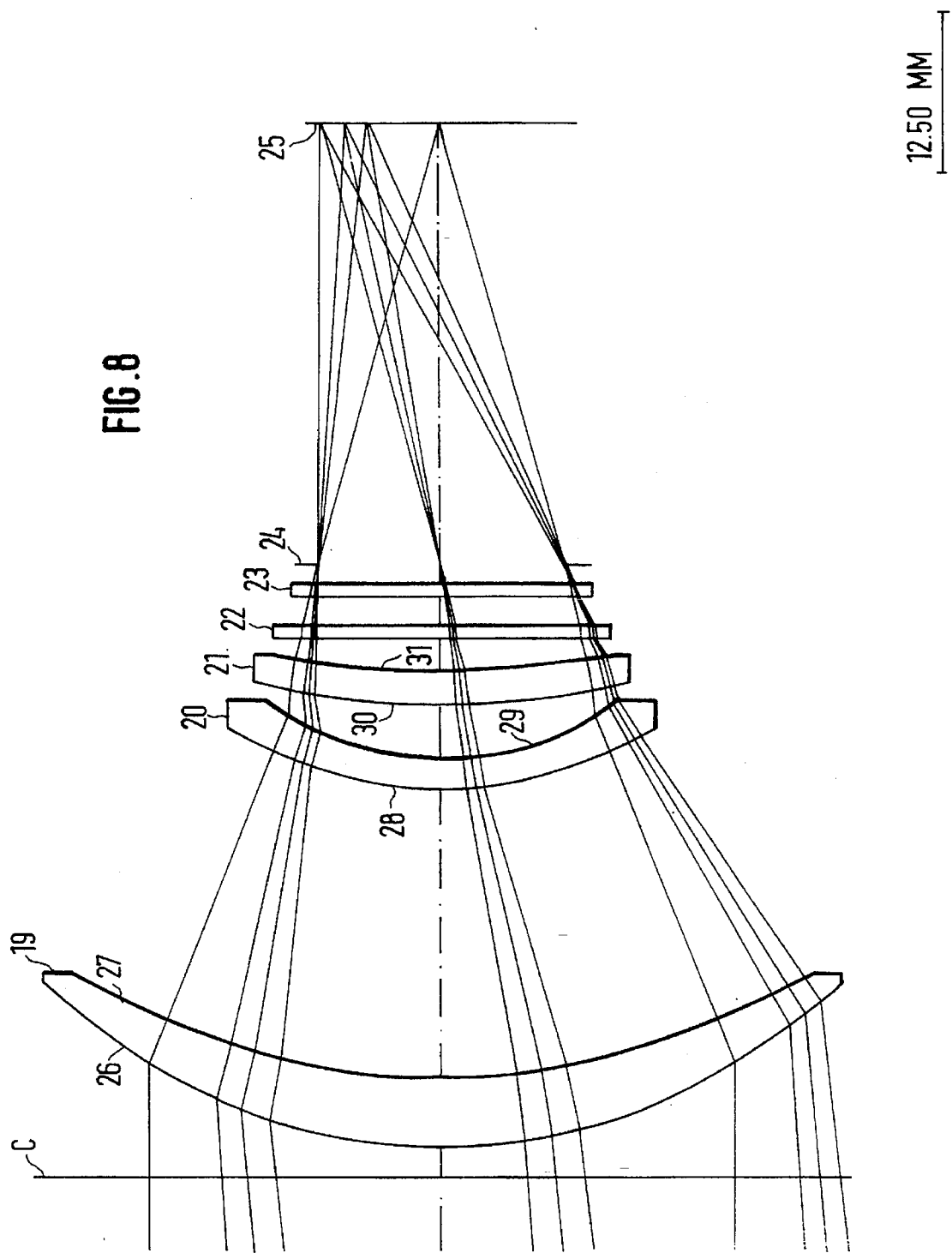
FIG. 8 shows a second embodiment of the lens system having three lenses wherein the aspherical surface has only a conical component.

The lens system shown in FIG. 8 comprises an object side lens 19, an intermediate lens 20 and an image side lens 21.

Further there are provided a germanium disk 22 forming a filter, a sapphire disk 23 forming an entrance window for a Dewar vessel and a rear diaphragm 24 within the Dewar vessel. The image plane is shown at 25. The object side lens 19 has a positive refractive power. It is made of a material having a relatively low dispersion, namely silicon. The object side lens 19 comprises a convex object side surface 26 and a concave image side surface 27. The radius of curvature of the image side surface 27 is greater than that of the object side surface 26. The object side surface 26 has an aspherical component A purely conical component of −0.083265 has been selected.

The intermediate lens 20 consists of a material having a relatively greater dispersion, namely germanium, and has a negative refractive power. The intermediate lens 20 comprises a convex object side surface 28 and a concave image side surface 29. The radius of curvature of the image side surface 29 is smaller than that of the object side surface 28.

The image side lens 21 consists of a material having a relatively smaller dispersion, namely silicon, and has a positive refractive power. The image side lens 21 comprises a convex object side surface 30 and a concave image side surface 31. The radius of curvature of the image side surface 31 is greater than that of the object side surface 30.

The intermediate lens 20 and the image side lens 21 are arranged with a small spacing therebetween. The spacing is considerably smaller than the spacing between the intermediate lens and the object side lens.

The lens system has a focal length of 86 mm. The aperture ratio of the lens system is 1:1.8. The overall length of the lens system is 81 mm. The wavelength transmission range is about 3–5 µm.

The line C again indicates the relevant principal plane. Again it is evident that the overall length of the lens system is smaller than the focal length.

The cooled rear diaphragm 24 which is within the Dewar vessel provides for a particularly good infrared operation.

The detailed lens data are indicated in table 2. As already mentioned, table 2 is set up in the same manner as table 1.

TABLE 2

|  | radius | thickness | material |
| --- | --- | --- | --- |
| object: | infinite | infinite |  |
| 1: | 45.319 | 5.50 | silicon |
| 2: | 58.156 | 22.73 |  |
| 3: | 32.866 | 2.40 | germanium |
| 4: | 24.732 | 4.08 |  |
| 5: | 58.030 | 3.00 | silicon |
| 6: | 91.603 | 2.49 |  |
| 7: | infinite | 1.00 | germanium |
| 8: | infinite | 2.30 |  |
| 9: | infinite | 1.00 | sapphire |
| 10: | infinite | 1.50 |  |
| 11: | infinite | 34.90 |  |
| 12: | infinite | 0.10 | silicon |
| 13: | infinite | 0.00 |  |
| image | infinite | 0.00 |  |

Asphere:
K: −0.083265

FIG. 9 gives the aberration curves for the lens system shown in FIG. 8. As already mentioned, FIG. 9 is set up in the same manner as FIG. 2. A comparison of FIGS. 2 and 9 indicates that the aberrations of the lens system shown in FIG. 8 are slightly higher than those of the lens system shown in FIG. 1.

Figure 10:
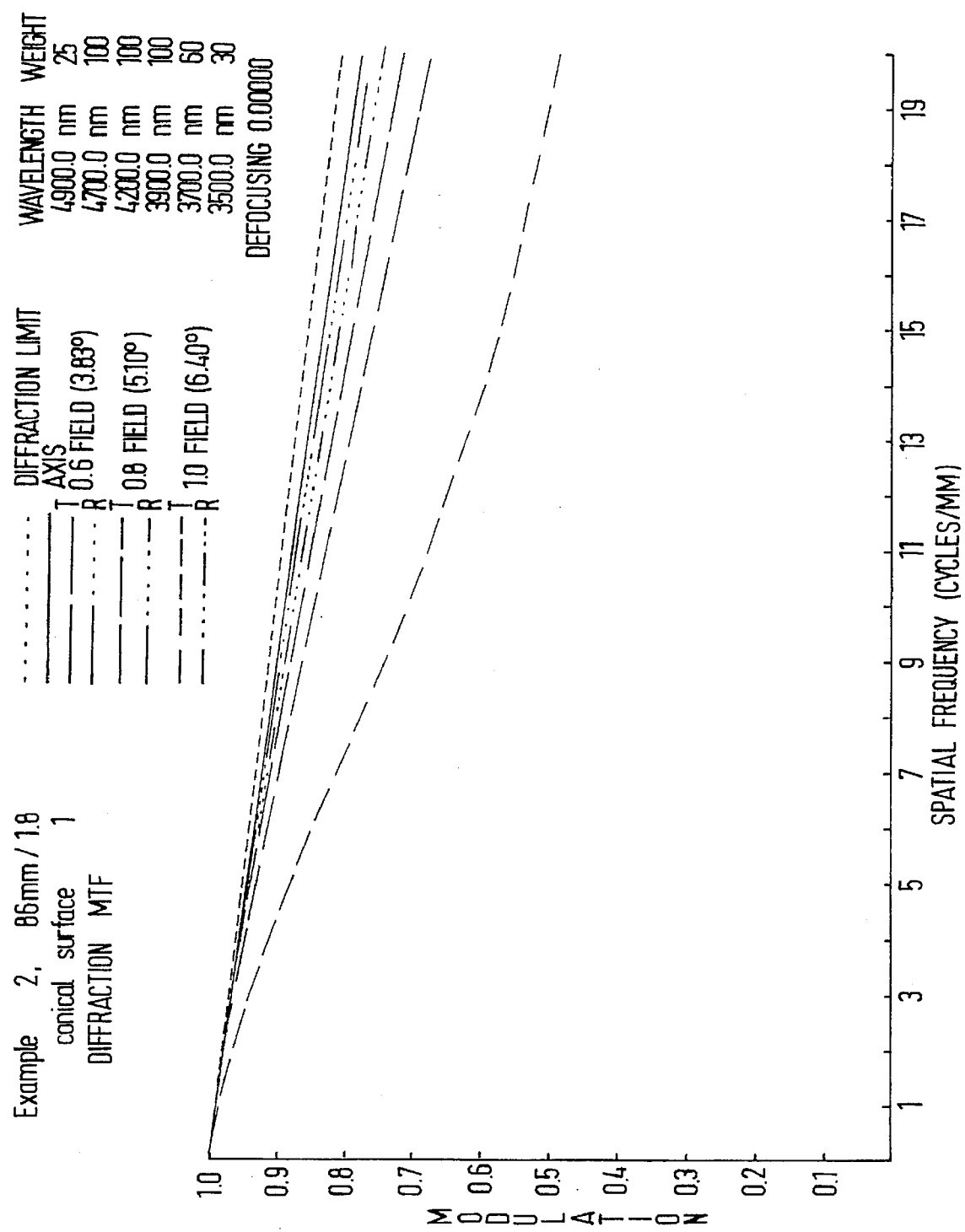
FIG. 10 shows the modulation transfer function of the lens system shown in FIG. 8.

FIG. 10 shows the modulation transfer function for the lens system shown in FIG. 8. As already mentioned, FIG. 10 is set up in the same manner as FIG. 3. A comparison of FIGS. 3 and 10 indicates that the modulation transfer function of both lens systems is very similar.

FIGS. 11 to 14 show the point-spread function of the lens system of FIG. 8. FIGS. 11 to 14 are set up in the same manner as the corresponding FIGS. 4 to 7. A comparison of the point-spread function as indicated in FIGS. 11 to 14 with the point-spread functions as indicated in FIGS. 4 to 7 shows that the point-spread function of the lens system of FIG. 8 is broader than the one of the lens system of FIG. 1 by a very slight amount.

EXAMPLE 3

Figure 15:
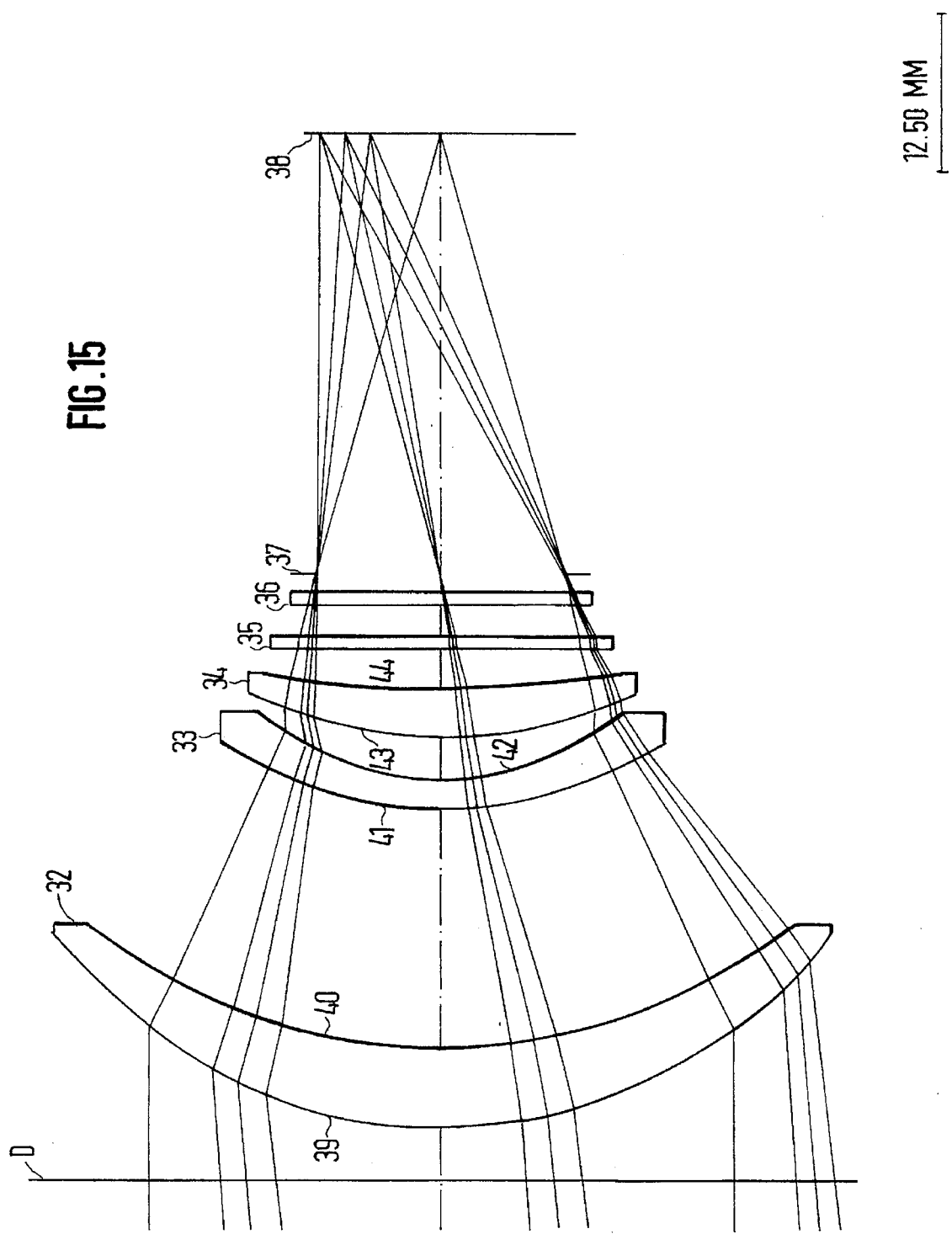
FIG. 15 shows a third embodiment of the lens system having three lenses and an image side lens which consists, in contrast to the first embodiment, of zinc selenide.

The lens system shown in FIG. 15 comprises an object side lens 32, an intermediate lens 33 and an image side lens 34. A filter in the form of a germanium disk 35 is disposed behind the image side lens 34. The lens system is arranged in front of a Dewar vessel having an inlet window which is formed by a sapphire disk 36. The rear diaphragm 37 of the lens system is within the Dewar vessel. The image plane within the Dewar is indicated by the reference numeral 38.

The object side lens 32 has a positive refractive power and, consisting of silicon, a relatively small dispersion. The object side lens 32 comprises a convex object side surface 39 which is aspherical and a concave image side surface 40. The radius of curvature of the image side surface 40 is greater than that of the object side surface 39.

The intermediate lens 33 has a negative refractive power and, consisting of germanium, has a relatively greater dispersion. The intermediate lens 33 has a convex object side surface 41 and a concave image side surface 42. The radius of curvature of the image side surface 42 is smaller than that of the object side surface 41.

A small spacing is provided between the intermediate lens 33 and the image side lens 34. The spacing is much smaller than the spacing between the intermediate lens 33 and the object side lens 32. The image side lens has a positive refractive power and consists of zinc selenide. The dispersion of zinc selenide is smaller than that of germanium, but greater than that of silicon. The refractive power of zinc selenide is smaller than that of germanium and silicon. The image side lens 34 has a convex object side surface 43 with a positive radius of curvature and a concave image side surface 44 with a positive radius of curvature. The radius of curvature of the image side surface 44 is greater than that of the object side surface 43.

The object side surface 39 of the object side lens 32 comprises an aspherical component. The conical fraction of the aspherical component comprises K=−0.053620; the coefficients of higher order are A=−0.161285×10$^{-7}$, B=−0.222806×10$^{-12}$, C=0.000000×10$^0$ and D=0.000000×10$^0$.

The lens system shown in FIG. 15 has a focal length of 86 mm. The aperture ratio of the lens system of FIG. 15 is 1:1.8. Owing to the changed material of the third lens the overall length was reduced to 79.5 mm. The wavelength transmission range is about 3–5 μm.

In FIG. 15 the line D indicates the position of the relevant principal plane. The slightly reduced construction is clearly visible.

The detailed lens data are given in the following table 3.

TABLE 3

| | radius | thickness | material |
|---|---|---|---|
| object: | infinite | infinite | |
| 1: | 38.595 | 6.50 | silicon |
| 2: | 45.996 | 19.14 | |
| 3: | 32.468 | 2.40 | germanium |
| 4: | 22.430 | 3.31 | |
| 5: | 35.465 | 4.00 | zinc selenide |
| 6: | 87.485 | 3.10 | |
| 7: | infinite | 1.00 | germanium |
| 8: | infinite | 2.50 | |
| 9: | infinite | 1.00 | sapphire |
| 10: | infinite | 1.50 | |
| 11: | infinite | 34.90 | |
| 12: | infinite | 0.10 | silicon |
| 13: | infinite | 0.00 | |
| image | infinite | 0.00 | |

Asphere:

K: −0.053620
A: −.161285E − 07   B: −.222806E − 12   C: 0.000000E + 00
D: 0.000000E + 00

FIG. 16 shows the modulation transfer function for the lens system of FIG. 15. FIG. 16 is set up in exactly the same manner as FIG. 3 for the lens system of FIG. 1. A comparison of FIG. 16 with FIG. 3 shows that at high frequencies the tangential modulation at the outer field edge is slightly lower for the lens system of FIG. 15 as compared with the one of FIG. 1.

FIG. 17 shows the aberration functions of the lens system of FIG. 15. FIG. 17 is set up exactly as FIG. 2.

FIGS. 18 to 21 show the point-spread functions of the lens system of FIG. 15. The FIGS. 18 to 21 are set up in exactly the same manner as FIGS. 4 to 7. A comparison of the FIGS. 4 to 7 with the FIGS. 18 to 21 shows that the point-spread functions of the lens systems of FIG. 1 and 15 are very similar.

EXAMPLE 4

Figure 22:
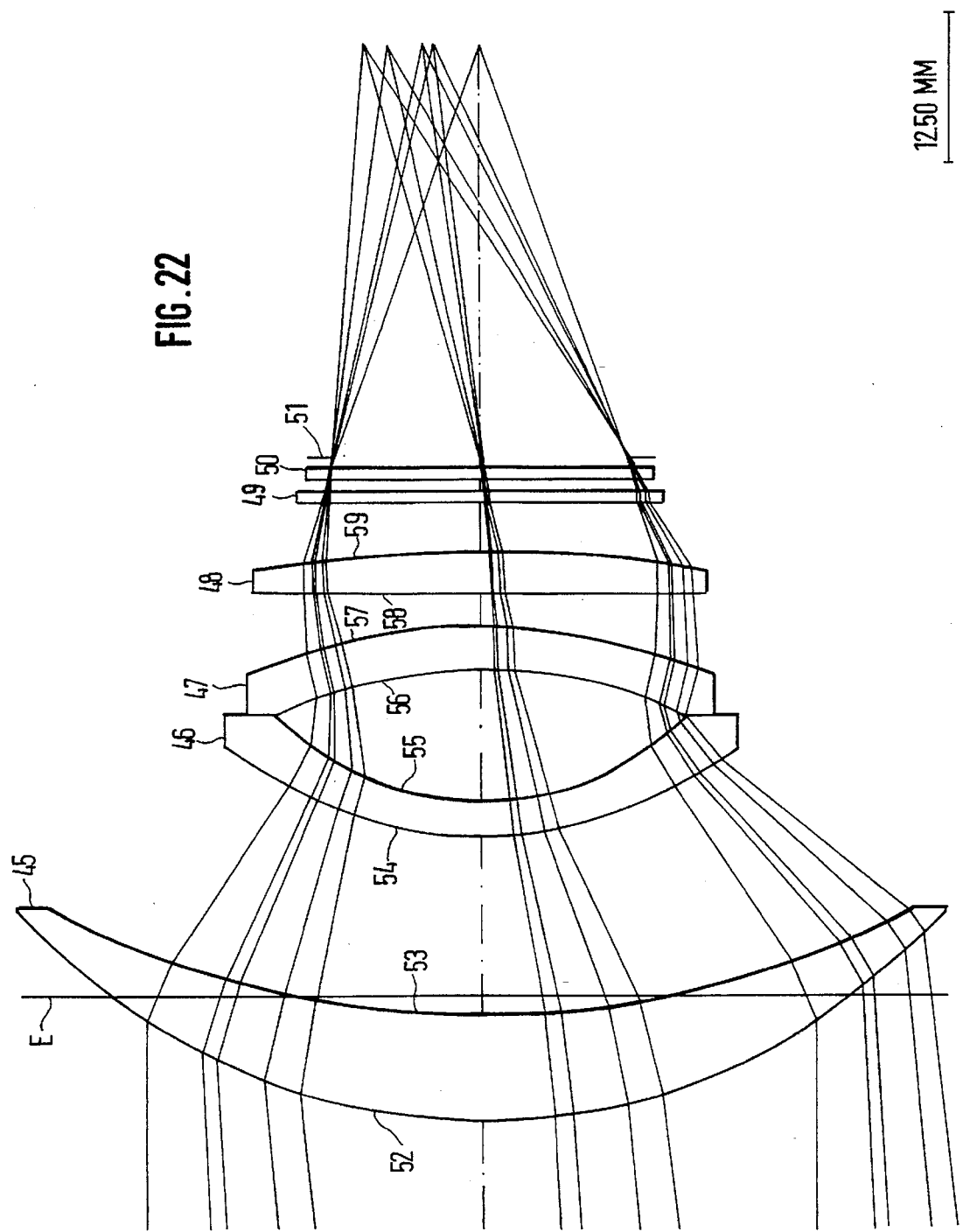
FIG. 22 shows a fourth embodiment of the lens system having four lenses.

In contrast to the above three embodiments the lens system shown in FIG. 22 comprises four lenses. The lens system of FIG. 22 can be regarded as being developed from the previous lens systems by splitting the intermediate lens of the preceding lens systems into two separate lenses.

An object side lens 45, a first intermediate lens 46, a second intermediate lens 47 and an image side lens 48 are provided. A filter in the form of a germanium disk 49 is provided behind the lens system. The lens system of FIG. 22 is disposed in front of a Dewar vessel having an entrance window which consists of a sapphire disk indicated at 50. A cooled rear diaphragm 51 is provided within the cooled Dewar vessel. The lens system is designed so that the rear diaphragm 51 functions as an aperture diaphragm in the same manner as in the above lens systems. Hence, no radiation issued from warm components directly strikes the detector which is an infrared detector. This lens system is therefore also well-suited for use in the infrared region.

The object side lens 45, consisting of silicon, has a relatively small dispersion and a positive refractive power. The object side lens 45 comprises a convex object side surface 52 which is aspherical and a concave image side surface 53. The radius of curvature of the image side surface 53 is greater than that of the object side surface 52.

The first intermediate lens 46 consisting of germanium has a relatively high dispersion and a negative refractive power. The first intermediate lens 46 comprises a convex object side surface 54 and a concave image side surface 55. The radius of curvature of the image side surface 55 is smaller than that of the object side surface 54.

The second intermediate lens 47 consisting of germanium has a relatively high dispersion and a negative refractive power. The second intermediate lens 47 comprises a concave object side surface 56 and a convex image side surface 57. The radius of curvature of the object side surface 56 is smaller than that of the image side surface 57.

The image side lens 48 consisting of silicon has a relatively small dispersion and a positive refractive power. The image side lens 48 comprises a convex object side surface 58 and a concave image side surface 59. The radius of curvature of the image side surface 59 is smaller than that of the object side surface 58.

The straight line E indicates the position of the relevant principal plane. As evident from FIG. 22 the lens system is slightly longer than the focal length. However, the lens system of FIG. 22 is still relatively short as compared with the conventional lens systems.

The lens system of FIG. 22 has a focal length of 86 mm and an aperture ratio of 1:1.4. The light transmitting capacity of the lens system is therefore particularly high. The overall length of the lens system of FIG. 22 is 92 mm. The wavelength transmission range is about 3–5 μm.

The first lens 45 has an object side surface 52 with an aspherical component which is purely conical with the value K = −0.186374.

The first and second intermediate lenses 46, 47 are in contact. No distance washer is therefore necessary between the first and second intermediate lenses. The lens assembly formed of the first and second intermediate lenses is positioned with a small distance from the image side lens 48 and a greater distance from the object side lens 45.

The detailed lens data of the lens system of FIG. 22 are given in table 4.

TABLE 4

|  | radius | thickness | material |
|---|---|---|---|
| object: | infinite | infinite |  |
| 1: | 52.243 | 9.00 | silicon |
| 2: | 80.920 | 15.30 |  |
| 3: | 35.787 | 3.00 | germanium |
| 4: | 24.861 | 11.45 |  |
| 5: | −40.664 | 3.80 | germanium |
| 6: | −50.728 | 2.56 |  |
| 7: | 724.569 | 3.90 | silicon |
| 8: | −117.672 | 4.00 |  |
| 9: | infinite | 1.00 | germanium |
| 10: | infinite | 1.00 |  |
| 11: | infinite | 1.00 | sapphire |
| 12: | infinite | 1.00 |  |
| 13: | infinite | 35.00 |  |
| image | infinite | 0.00 |  |

Asphere:
K: −0.186374

The table 4 substantially corresponds to table 1. It will, however, be noted that table 4 has an additional lens. The rear diaphragm 51 has therefore been given the number 13.

The aberration functions for the lens system of FIG. 22 are shown in FIG. 23 which is set up in the same manner as FIG. 2. A comparison of the aberration functions of FIG. 2 and FIG. 23 shows that the aberrations can be even better corrected for such a faster lens system.

FIG. 24 shows the modulation transfer function of the lens system of FIG. 22. FIG. 24 is set up in exactly the same manner as FIG. 3. A comparison of the MTF-functions of FIG. 24 with those of FIG. 3 shows that the modulation transfer function of the lens system of FIG. 22 is better than that of the lens system of FIG. 1.

The FIGS. 25 to 28 show the point-spread functions of the lens system of FIG. 22 and are set up in the same manner as the FIGS. 4 to 7. A comparison of the point-spread functions of the FIGS. 4 to 7 with those of the FIGS. 25 to 28 clearly shows that the point-spread functions can be markedly improved with the lens system of FIG. 22.

Summarizing it can be stated that—as was expected—the lens system comprising four lenses has better imaging characteristics than the lens systems comprising three lenses. However, it is in particular the larger aperture which makes the 4-lens system better.

Although the invention has been described with reference to specific example embodiments it is to be understood that it is intended to cover all modifications and equivalents within the scope of the appended claims.

What is claimed is:

1. A dioptric lens system comprising
   an object side lens having a positive refractive power and an aspherical object side surface,
   an intermediate dispersing lens,
   a first spacing between said object side lens and said intermediate lens,
   an image side lens having a positive refractive power,
   a second spacing between said image side lens and said intermediate lens, said second spacing being substantially smaller than said first spacing, and
   a rear diaphragm constituting an exit pupil of said lens system,
   wherein a real image is formed behind the rear diaphragm.

2. The lens system of claim 1, said lens system having an overall length which is smaller than or equal to 4/3 of the focal length of the lens system and preferably smaller or equal to the focal length of the lens system.

3. The lens system of claim 1, wherein the surfaces of said object side lens, said intermediate lens and said image side lens are spherical surfaces with the exception of an object side surface of said object side lens.

4. The lens system of claim 1, said aspherical surface comprising a conical component.

5. The lens system of claim 1, wherein the aspherical surface is described by the formula Z=f(h),
   wherein
   Z=coordinate along the optical axis and
   h=coordinate perpendicular to the optical axis,
   f=function of h, including powers of $h^2$, $h^4$, $h^6$, $h^8$, and $h^{10}$.

6. The lens system of claim 1, wherein said object side lens is a forwardly curved meniscus, said intermediate lens is a forwardly curved meniscus and said image side lens is a forwardly curved meniscus.

7. The lens system of claim 1, wherein said object side lens has a first dispersion, said intermediate lens has a relatively high dispersion compared with the object side lens and said image side lens has a dispersion which is comparable with that of said object side lens.

8. The lens system of claim 7, wherein said object side lens consists of silicon, said intermediate lens consists of germanium and said image side lens consists of silicon or zinc selenide, the transmission range being substantially from 3 μm to 5 μm.

9. The lens system of claim 7, wherein said object side lens consists of germanium, said intermediate lens consists of zinc sulfide or zinc selenide, and said image side lens consists of germanium, the transmission range being between about 8 μm and 12 μm.

10. The lens system of claim 1, comprising three lens assemblies, a first object side lens assembly having said object side lens with a second dispersion, a second lens assembly having a first intermediate and a second intermediate lens both having a relatively high dispersion compared with the object side lens and a third image side lens assembly comprising said image side lens having a relatively low dispersion compared with the object side lens.

11. The lens system of claim 10, said object side lens and said first intermediate lens being a forwardly curved meniscus, said second intermediate lens being a rearwardly curved meniscus and said image side lens being a biconvex lens.

12. The lens system of claim 10 wherein said object side lens consists of silicon, said two intermediate lenses consist of germanium and said image side lens consists of silicon or zinc selenide, the transmission range of the lens system being within the wavelength range of about 3 μm to about 5 μm.

13. The lens system of claim 10, wherein said object side lens consists of germanium, said two intermediate lenses consist of zinc sulfide or zinc selenide and said image side lens consists of germanium, the transmission range of the lens system being within the wavelength region of about 8 μm to about 12 μm.

14. Lens system of claim 1, having the following lens data:

|  | radius | thickness | material |
|---|---|---|---|
| object: | infinite | infinite |  |
| 1: | 43.387 | 5.50 | silicon |
| 2: | 53.206 | 25.15 |  |
| 3: | 38.154 | 2.40 | germanium |
| 4: | 25.716 | 1.54 |  |
| 5: | 38.206 | 3.00 | silicon |
| 6: | 63.747 | 2.41 |  |
| 7: | infinite | 1.00 | germanium |
| 8: | infinite | 2.50 |  |
| 9: | infinite | 1.00 | sapphire |
| 10: | infinite | 1.50 |  |
| 11: | infinite | 34.90 |  |
| 12: | infinite | 0.10 | silicon |
| 13: | infinite | 0.00 |  |
| image | infinite | 0.00 |  |

Asphere:

K: −0.083265
A: 0.442096E − 07   B: 0.000000E + 00   C: 0.409682E − 13
D: −.319450E − 17

15. Lens system of claim 1, having the following lens data:

|  | radius | thickness | material |
|---|---|---|---|
| object: | infinite | infinite |  |
| 1: | 45.319 | 5.50 | silicon |
| 2: | 58.156 | 22.73 |  |
| 3: | 32.866 | 2.40 | germanium |
| 4: | 24.732 | 4.08 |  |
| 5: | 58.030 | 3.00 | silicon |
| 6: | 91.603 | 2.49 |  |
| 7: | infinite | 1.00 | germanium |
| 8: | infinite | 2.30 |  |
| 9: | infinite | 1.00 | sapphire |
| 10: | infinite | 1.50 |  |
| 11: | infinite | 34.90 |  |
| 12: | infinite | 0.10 | silicon |
| 13: | infinite | 0.00 |  |
| image | infinite | 0.00 |  |

Asphere:
K: −0.083265

16. Lens system of claim 1, having the following lens data:

|  | radius | thickness | material |
|---|---|---|---|
| object: | infinite | infinite |  |
| 1: | 38.595 | 6.50 | silicon |
| 2: | 45.996 | 19.14 |  |
| 3: | 32.468 | 2.40 | germanium |
| 4: | 22.430 | 3.31 |  |
| 5: | 35.465 | 4.00 | zinc selenide |
| 6: | 87.485 | 3.10 |  |
| 7: | infinite | 1.00 | germanium |
| 8: | infinite | 2.50 |  |
| 9: | infinite | 1.00 | sapphire |
| 10: | infinite | 1.50 |  |
| 11: | infinite | 34.90 |  |
| 12: | infinite | 0.10 | silicon |
| 13: | infinite | 0.00 |  |
| image | infinite | 0.00 |  |

Asphere:
K: −0.053620
A: −.161285E − 07   B: −.222806E − 12   C: 0.000000E + 00
D: 0.000000E + 00

17. Lens system of claim 1, having the following lens data:

|  | radius | thickness | material |
|---|---|---|---|
| object: | infinite | infinite |  |
| 1: | 52.243 | 9.00 | silicon |
| 2: | 80.920 | 15.30 |  |
| 3: | 35.787 | 3.00 | germanium |
| 4: | 24.861 | 11.45 |  |
| 5: | −40.664 | 3.80 | germanium |
| 6: | −50.728 | 2.56 |  |
| 7: | 724.569 | 3.90 | silicon |
| 8: | −117.672 | 4.00 |  |
| 9: | infinite | 1.00 | germanium |
| 10: | infinite | 1.00 |  |
| 11: | infinite | 1.00 | sapphire |
| 12: | infinite | 1.00 |  |
| 13: | infinite | 35.00 |  |
| image | infinite | 0.00 |  |

Asphere:
K: −0.186374

18. A dioptric lens system comprising:

an object side lens having a positive refractive power and an aspherical object side surface, an intermediate dispersing lens, a first spacing between said object side lens and said intermediate lens, an image side lens having a positive refractive power, a second spacing between said image side lens and said intermediate lens, said second spacing being substantially smaller than said first spacing, and a rear diaphragm constituting an exit pupil of said lens system, the lens system having the following lens data:

|  | radius | thickness | material |
|---|---|---|---|
| object: | infinite | infinite | |
| 1: | 43.387 | 5.50 | silicon |
| 2: | 53.206 | 25.15 | |
| 3: | 38.154 | 2.40 | germanium |
| 4: | 25.716 | 1.54 | |
| 5: | 38.206 | 3.00 | silicon |
| 6: | 63.747 | 2.41 | |
| 7: | infinite | 1.00 | germanium |
| 8: | infinite | 2.50 | |
| 9: | infinite | 1.00 | sapphire |
| 10: | infinite | 1.50 | |
| 11: | infinite | 34.90 | |
| 12: | infinite | 0.10 | silicon |
| 13: | infinite | 0.00 | |
| image | infinite | 0.00 | |
| Asphere: | | | |
| K: −0.083265 | | | |
| A: 0.442096E − 07  B: 0.000000E + 00  C: 0.409682E − 13 | | | |
| D: −.319450E − 17. | | | |

19. A dioptric lens system comprising:

an object side lens having a positive refractive power and an aspherical object side surface, an intermediate dispersing lens, a first spacing between said object side lens and said intermediate lens, an image side lens having a positive refractive power, a second spacing between said image side lens and said intermediate lens, said second spacing being substantially smaller than said first spacing, and a rear diaphragm constituting an exit pupil of said lens system, the lens system having the following lens data:

|  | radius | thickness | material |
|---|---|---|---|
| object: | infinite | infinite | |
| 1: | 45.319 | 5.50 | silicon |
| 2: | 58.156 | 22.73 | |
| 3: | 32.866 | 2.40 | germanium |
| 4: | 24.732 | 4.08 | |
| 5: | 58.030 | 3.00 | silicon |
| 6: | 91.603 | 2.49 | |
| 7: | infinite | 1.00 | germanium |
| 8: | infinite | 2.30 | |
| 9: | infinite | 1.00 | sapphire |
| 10: | infinite | 1.50 | |
| 11: | infinite | 34.90 | |
| 12: | infinite | 0.10 | silicon |
| 13: | infinite | 0.00 | |
| image | infinite | 0.00 | |
| Asphere: | | | |
| K: −0.083265. | | | |

20. A dioptric lens system comprising:

an object side lens having a positive refractive power and an aspherical object side surface, an intermediate spacing between said object side lens and said intermediate lens, a first spacing between said object side lens and said intermediate lens, an image side lens having a positive refractive power, a second spacing between said image side lens and said intermediate lens, said second spacing being substantially smaller than said first spacing, and a rear diaphragm constituting an exit pupil of said lens system, the lens system having the following lens data:

|  | radius | thickness | material |
|---|---|---|---|
| object: | infinite | infinite | |
| 1: | 38.595 | 6.50 | silicon |
| 2: | 45.996 | 19.14 | |
| 3: | 32.468 | 2.40 | germanium |
| 4: | 22.430 | 3.31 | |
| 5: | 35.465 | 4.00 | zinc selenide |
| 6: | 87.485 | 3.10 | |
| 7: | infinite | 1.00 | germanium |
| 8: | infinite | 2.50 | |
| 9: | infinite | 1.00 | sapphire |
| 10: | infinite | 1.50 | |
| 11: | infinite | 34.90 | |
| 12: | infinite | 0.10 | silicon |
| 13: | infinite | 0.00 | |
| image | infinite | 0.00 | |
| Asphere: | | | |
| K: −0.053620 | | | |
| A: −.161285E − 07  B: −.222806E − 12  C: 0.0000000E + 00 | | | |
| D: 0.000000E + 00. | | | |

21. A dioptric lens system comprising:

an object side lens having a positive refractive power and an aspherical object side surface, an intermediate dispersing lens, a first spacing between said object side lens and said intermediate lens, an image side lens having a positive refractive power, a second spacing between said image side lens and said intermediate lens, said second spacing being substantially smaller than said first spacing, and a rear diaphragm constituting an exit pupil of said lens system, the lens system having the following lens data:

|  | radius | thickness | material |
|---|---|---|---|
| object: | infinite | infinite | |
| 1: | 52.243 | 9.00 | silicon |
| 2: | 80.920 | 15.30 | |
| 3: | 35.787 | 3.00 | germanium |
| 4: | 24.861 | 11.45 | |
| 5: | −40.664 | 3.80 | germanium |
| 6: | −50.728 | 2.56 | |
| 7: | 724.569 | 3.90 | silicon |
| 8: | −117.672 | 4.00 | |
| 9: | infinite | 1.00 | germanium |
| 10: | infinite | 1.00 | |
| 11: | infinite | 1.00 | sapphire |
| 12: | infinite | 1.00 | |
| 13: | infinite | 35.00 | |
| image | infinite | 0.00 | |
| Asphere: | | | |
| K: −0.186374. | | | |

* * * * *